US012768585B2

(12) United States Patent
Jung et al.

(10) Patent No.: US 12,768,585 B2
(45) Date of Patent: Oct. 20, 2026

(54) VACUUM ADIABATIC BODY

(71) Applicant: LG ELECTRONICS INC., Seoul (KR)

(72) Inventors: Wonyeong Jung, Seoul (KR); Deokhyun Youn, Seoul (KR); Sungsub Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 18/034,840

(22) PCT Filed: Nov. 1, 2021

(86) PCT No.: PCT/KR2021/015491
§ 371 (c)(1),
(2) Date: May 1, 2023

(87) PCT Pub. No.: WO2022/092925
PCT Pub. Date: May 5, 2022

(65) Prior Publication Data

US 2023/0408173 A1 Dec. 21, 2023

(30) Foreign Application Priority Data

Nov. 2, 2020 (KR) ........................ 10-2020-0144744

(51) Int. Cl.
*F25D 23/06* (2006.01)
*B32B 5/18* (2006.01)
(Continued)

(52) U.S. Cl.
CPC .............. *F25D 23/062* (2013.01); *B32B 5/18* (2013.01); *B32B 15/085* (2013.01); *B32B 15/18* (2013.01);
(Continued)

(58) Field of Classification Search
CPC ............... Y10T 428/23; Y10T 428/231; Y10T 428/24273; Y10T 428/24322;
(Continued)

(56) References Cited

U.S. PATENT DOCUMENTS

| | | | | |
|---|---|---|---|---|
| 3,289,423 | A | 12/1966 | Berner et al. | |
| 3,834,096 | A | 9/1974 | Becker | |
| 2019/0255980 | A1 * | 8/2019 | Jung | B60N 3/104 |

FOREIGN PATENT DOCUMENTS

| | | |
|---|---|---|
| DE | 1253735 | 11/1967 |
| GB | 890372 | 2/1962 |

(Continued)

OTHER PUBLICATIONS

Extended European Search Report dated Dec. 3, 2024 issued in Application No. 21886919.6.

(Continued)

*Primary Examiner* — Maria V Ewald
*Assistant Examiner* — Ethan A. Utt
(74) *Attorney, Agent, or Firm* — KED & ASSOCIATES, LLP

(57) ABSTRACT

A vacuum adiabatic body according to an embodiment may include a first plate, a second plate, and a seal that seals a gap between the first plate and the second plate. Optionally, the vacuum adiabatic body according to an embodiment may include a support that maintains a vacuum space. Optionally, the vacuum adiabatic body according to an embodiment may include a heat transfer resistor that reduces an amount of heat transfer between the first plate and the second plate. Optionally, the vacuum adiabatic body may include a component coupling portion connected to at least one of the first or second plate so that a component is coupled thereto. Optionally, the vacuum adiabatic body may include a tube passing through the first plate. Optionally, the vacuum
(Continued)

adiabatic body may include a flange provided on the first plate to guide the tube. Optionally, a height from the first plate to an insertion end of the tube may be less than a height of the vacuum space. Accordingly, the vacuum adiabatic body may be improved in productivity. Examples of the aforementioned tube may be ports such as an exhaust port or a getter port.

20 Claims, 22 Drawing Sheets

(51) Int. Cl.

| | |
|---|---|
| ***B32B 15/085*** | (2006.01) |
| ***B32B 15/18*** | (2006.01) |
| ***B32B 27/06*** | (2006.01) |
| ***B32B 27/32*** | (2006.01) |

(52) U.S. Cl.

CPC ............ *B32B 27/065* (2013.01); *B32B 27/32* (2013.01); *F25D 23/067* (2013.01); *B32B 2307/304* (2013.01); *B32B 2509/10* (2013.01); *F25D 2201/14* (2013.01)

(58) Field of Classification Search

CPC ... Y10T 428/24331; B32B 3/26; B32B 3/266; B32B 2509/00; B32B 2509/10; F25D 23/00; F25D 23/06; F25D 23/062; F25D 23/065; F25D 2201/00; F25D 2201/10; F25D 2201/14

USPC ............................ 428/68, 69, 131, 137, 138

See application file for complete search history.

(56) References Cited

FOREIGN PATENT DOCUMENTS

| | | |
|---|---|---|
| JP | 2004-232735 | 8/2004 |
| JP | 4175905 | 11/2008 |
| JP | 2011-033079 | 2/2011 |
| JP | 2011-174602 | 9/2011 |
| KR | 10-2017-0016240 | 2/2017 |
| KR | 10-2017-0016242 | 2/2017 |
| KR | 10-2018-0095279 | 8/2018 |
| WO | WO 03/081152 | 10/2003 |

OTHER PUBLICATIONS

International Search Report dated Feb. 10, 2022 issued in Application No. PCT/KR2021/015491.

* cited by examiner

VACUUM ADIABATIC BODY

CROSS-REFERENCE TO RELATED PATENT APPLICATIONS

This application is a U.S. National Stage Application under 35 U.S.C. § 371 of PCT Application No. PCT/KR2021/015491, filed Nov. 1, 2021, which claims priority to Korean Patent Application No. 10-2020-0144744, filed Nov. 2, 2020, whose entire disclosures are hereby incorporated by reference.

TECHNICAL FIELD

The present disclosure relates to a vacuum adiabatic body.

BACKGROUND ART

A vacuum adiabatic wall may be provided to improve adiabatic performance. A device of which at least a portion of an internal space is provided in a vacuum state to achieve an adiabatic effect is referred to as a vacuum adiabatic body.

The applicant has developed a technology to obtain a vacuum adiabatic body that is capable of being used in various devices and home appliances. Accordingly, the applicant has proposed a technology for disposing an exhaust port to exhaust air inside a vacuum space in Korean Patent Application No. 10-2015-01097235.

The cited document discloses a feature in which the exhaust port is provided on a first plate of the vacuum adiabatic body. The above-described cited document does not suggest a structure of the exhaust port and a method for providing the exhaust port in consideration of an adiabatic loss, interference prevention, structural simplification, exhaust flow path resistance, and coupling strength.

DISCLOSURE OF INVENTION

Technical Problem

Embodiments provide a vacuum adiabatic body capable of reducing an adiabatic loss occurring due to a tube.

Embodiments also provide a tube that is prevented from interfering with other members.

Embodiments also provide a tube that is simplified in structure by performing functions of a getter port and an exhaust port, which are required for an operation of a vacuum adiabatic body, together.

Embodiments also provide a tube that is capable of reducing exhaust flow path resistance when a vacuum space is exhausted.

Embodiments also provide a vacuum adiabatic body that is capable of increasing in coupling strength between a tube and a support member supporting the tube. Examples of the aforementioned tube may be ports such as an exhaust port or a getter port.

Embodiments also provide technical problems and specific solutions for solving the technical problems in [Technical Solution] and [Mode for Carrying Out the Invention] in addition to the examples proposed above.

Solution to Problem

A vacuum adiabatic body according to an embodiment may include a first plate, a second plate, and a seal that seals a gap between the first plate and the second plate. Optionally, the vacuum adiabatic body according to an embodiment may include a support that maintains a vacuum space. Optionally, the vacuum adiabatic body according to an embodiment may include a heat transfer resistor that reduces an amount of heat transfer between the first plate and the second plate. Optionally, the vacuum adiabatic body may include a component coupling portion connected to at least one of the first or second plate so that a component is coupled thereto. Accordingly, the vacuum adiabatic body capable of achieving the industrial purpose may be provided.

Optionally, the vacuum adiabatic body may include a tube passing through the first plate. Optionally, the tube may be provided in a predetermined shape. Optionally, the tube may extend into the vacuum space. Examples of the aforementioned tube may be ports such as an exhaust port or a getter port.

Optionally, the vacuum adiabatic body may include a flange provided on the first plate to guide the tube. Accordingly, the first plate and the flange may be firmly coupled to each other.

Optionally, a height from the first plate to an insertion end of the tube may be less than a height of the vacuum space. Accordingly, an interference between the tube and components inside the vacuum space may be minimized.

Optionally, the height from the first plate to the insertion end of the tube may be less than a height from the first plate to a radiation resistance sheet. Accordingly, the radiation resistance sheet may reduce radiant heat transfer without interfering with the tube.

Optionally, a length from the first plate to the insertion end of the tube may be greater than a length from the first plate to the radiation resistance sheet. Accordingly, the tube may pass through the radiation resistance sheet. Accordingly, air in the vacuum space may be quickly exhausted without flow resistance.

Optionally, the length from the first plate to the insertion end of the tube may be greater than a length between the insertion end of the tube and the second plate. Accordingly, a getter having a small size inside the tube may be supported.

Optionally, the vacuum adiabatic body may further include the radiation resistance sheet extending in a longitudinal direction of the vacuum space. Accordingly, radiant heat transfer inside the vacuum space may be reduced.

Optionally, an outer diameter of the tube may be less than a diameter of the through-hole of the radiation resistance sheet. Accordingly, heat conduction between the tube and the radiation resistance sheet may be prevented. Therefore, adiabatic performance may be improved.

Optionally, a diameter of the through-hole of the radiation resistance sheet may be less than a diagonal length of a pair of adjacent bars of the support. Accordingly, the radiation resistance sheet may be stably supported by the support. Accordingly, the tube may not interfere with the operation of the support. Accordingly, the support may stably support the first and second plates.

Optionally, the vacuum adiabatic body may include a bar provided on the support. Optionally, a bar through-hole provided in the radiation resistance sheet through which the bar passes may be provided. Accordingly, the radiation resistance sheet may be supported on the bar.

Optionally, the bar may have a minimum outer diameter portion having the smallest diameter at a point at which the bar through-hole is defined. Accordingly, contact between the radiation resistance sheet and the bar may be limited. Therefore, the heat conduction may be reduced.

Optionally, in the bar, a large diameter portion having a diameter greater than that of the minimum outer diameter portion may be provided above and below the minimum outer diameter portion. Accordingly, gap maintaining performance of the first and second plates may be maintained by the bar.

Optionally, the vacuum adiabatic body may include the radiation resistance sheet extending in a longitudinal direction of the vacuum space. Optionally, the radiation resistance sheet may include the bar through-hole through which the support passes. Optionally, a diameter of the bar through-hole may be less than that of the tube. With this configuration, the heat conduction through the support may be reduced. Accordingly, the exhaust process may be quickly performed through the tube.

Optionally, the tube may be provided in a second vacuum space having a height less than that of the first vacuum space. Accordingly, the tube may be prevented from adversely affecting an adiabatic effect of the vacuum space.

Optionally, a second vacuum space may be placed on a peripheral portion of the first vacuum space. Optionally, the second vacuum space may be further insulated by another adiabatic body. Accordingly, the tube may also be insulated by another adiabatic body. Accordingly, adiabatic performance may be prevented from being deteriorated due to the heat conduction of the tube.

Optionally, a getter for adsorbing a gas may be accommodated inside the tube. Accordingly, the tube may perform operations of exhaust and gettering together.

Optionally, the tube may be placed between grids of the support to secure a placed position of the getter. Examples of the aforementioned tube may be ports such as an exhaust port or a getter port.

A method for manufacturing a vacuum adiabatic body according to another aspect may include providing a tube connecting a vacuum space and an external space to a first plate. Optionally, during an exhaust process of discharging air inside the vacuum space through a tube, the method may include inputting a getter into the tube. Optionally, the method may include performing pressure welding on the tube. According to an embodiment, the tube may be improved in utility as a single tube. Accordingly, closure reliability of the tube is improved. Examples of the aforementioned tube may be ports such as an exhaust port or a getter port.

Optionally, a getter may be input in a state of being activated at the outside. Accordingly, gettering may be performed quickly.

A vacuum adiabatic body according to further another aspect may include a tube which passes through a plate and of which one end is inserted into a vacuum space. Optionally, the tube may provide an exhaust passage for the vacuum space. Optionally, the tube may be an exhaust/getter-integrated port supporting a getter. According to this, there is an advantage in that productivity of the vacuum adiabatic body is improved. Examples of the aforementioned tube may be ports such as an exhaust port or a getter port.

Optionally, the length from the first plate to the insertion end of the tube may be greater than a length between the insertion end of the tube and the second plate. Optionally, the getter may be accommodated in a portion of the tube placed inside the vacuum space.

Optionally, the tube may pass through a radiation resistance sheet. Accordingly, an accommodation space for the getter may be sufficiently secured.

Optionally, a through-hole having a diameter greater than that of the tube may be provided in the radiation resistance sheet. Accordingly, it may be possible to reduce heat leakage and support the getter together.

Optionally, a tube for mounting the getter that does not require large or high activation such as a combo getter may be separately provided. A sealing may have a temperature greater than a melting point of any one of the heat transfer resistors. the sealing may be performed at a temperature less than the melting point of the other one of the heat transfer resistors. the sealing may be greater than a melting point of the radiation resistance sheet of the heat transfer resistor. the sealing may be performed at a temperature less than a melting point of the conductive resistance sheet of the heat transfer resistor.

Optionally, an empty space may be provided in a space spaced apart between first and second portions of the heat transfer resistor. The first portion and the second portion may be provided as separate components separated from each other. The empty space may be provided in a space spaced apart between the heat transfer resistor and a component provided outside the edge of the heat transfer resistor. The heat transfer resistor and the component may be provided as separate components separated from each other.

Optionally, A portion may be provided on the peripheral portion of the heat transfer resistor. Any one of the first and second plates may be provided to be integrated with the heat transfer resistor. the portion may be provided on the peripheral portion of the heat transfer resistor, and any one of the first and second plates may be provided to be integrated with the heat transfer resistor. the portion may be provided at a center of the heat transfer resistor. The heat transfer resistor may be provided to be coupled to or sealed to at least one of the first or second plate.

Optionally, one end of the inner tube may be connected to the through-hole defined in any one of the first and second plates.

Optionally, the tube may be guided to the flange. The tube may extend in the height direction of the vacuum space. The tube may serve as an exhaust port. The tube may serve as a getter port.

Advantageous Effects of Invention

According to the embodiment, the tube may not be exposed to the external space, may not be in contact with the radiation resistance sheet and/or support, and may be coupled to the plate to reduce an adiabatic loss. Examples of the aforementioned tube may be ports such as an exhaust port or a getter port.

According to the embodiment, the exhaust operation and/or the getter support operation may be performed together through the single tube. To achieve this object, the tube may be inserted by the appropriate length into the vacuum space.

The tube may have the diameter and length so that the exhaust operation and/or the getter support operation may be performed together.

According to the embodiment, the tube may have the diameter that is suitable for the size of the getter. The flow resistance of the exhaust air may be reduced during the exhaust to maximally realize the performance of the single tube. Here, the diagonal line connecting the bars of the support may be larger than the diameter of the tube so as not to cause the limitation in maintaining the gap of the plate by the support.

According to the embodiment, the other end of the tube may be accommodated in another adiabatic body. Accordingly, the adiabatic performance of the other end of the tube that is not placed inside the vacuum space may be prevented from being deteriorated.

According to the embodiment, the position and relative configuration of the vacuum space and the tube may be optimized to reduce the adiabatic loss of the vacuum adiabatic body.

MODE FOR THE INVENTION

Figure 1:
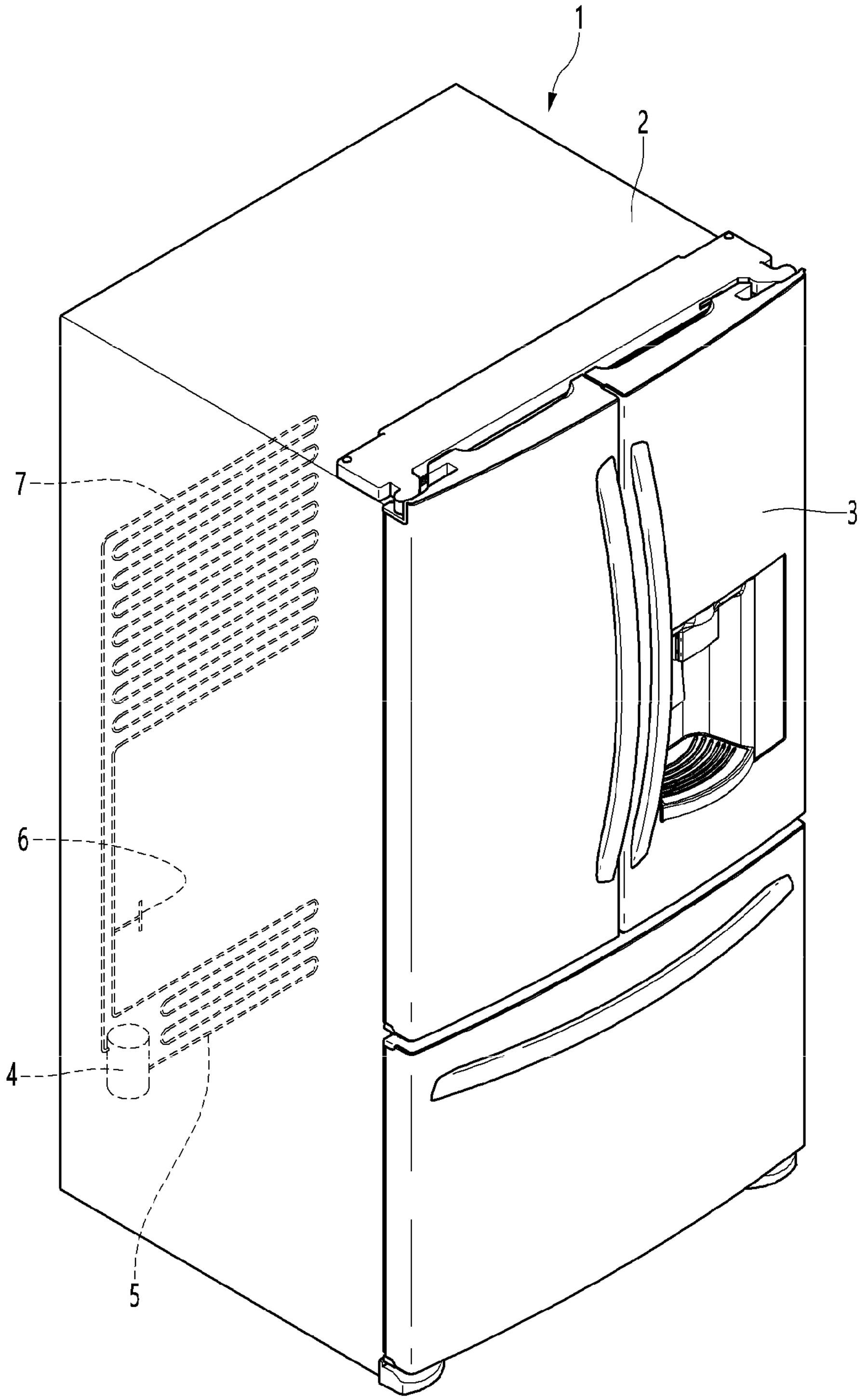
FIG. 1 is a perspective view of a refrigerator according to an embodiment.

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression “plate” may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

Figure 2:
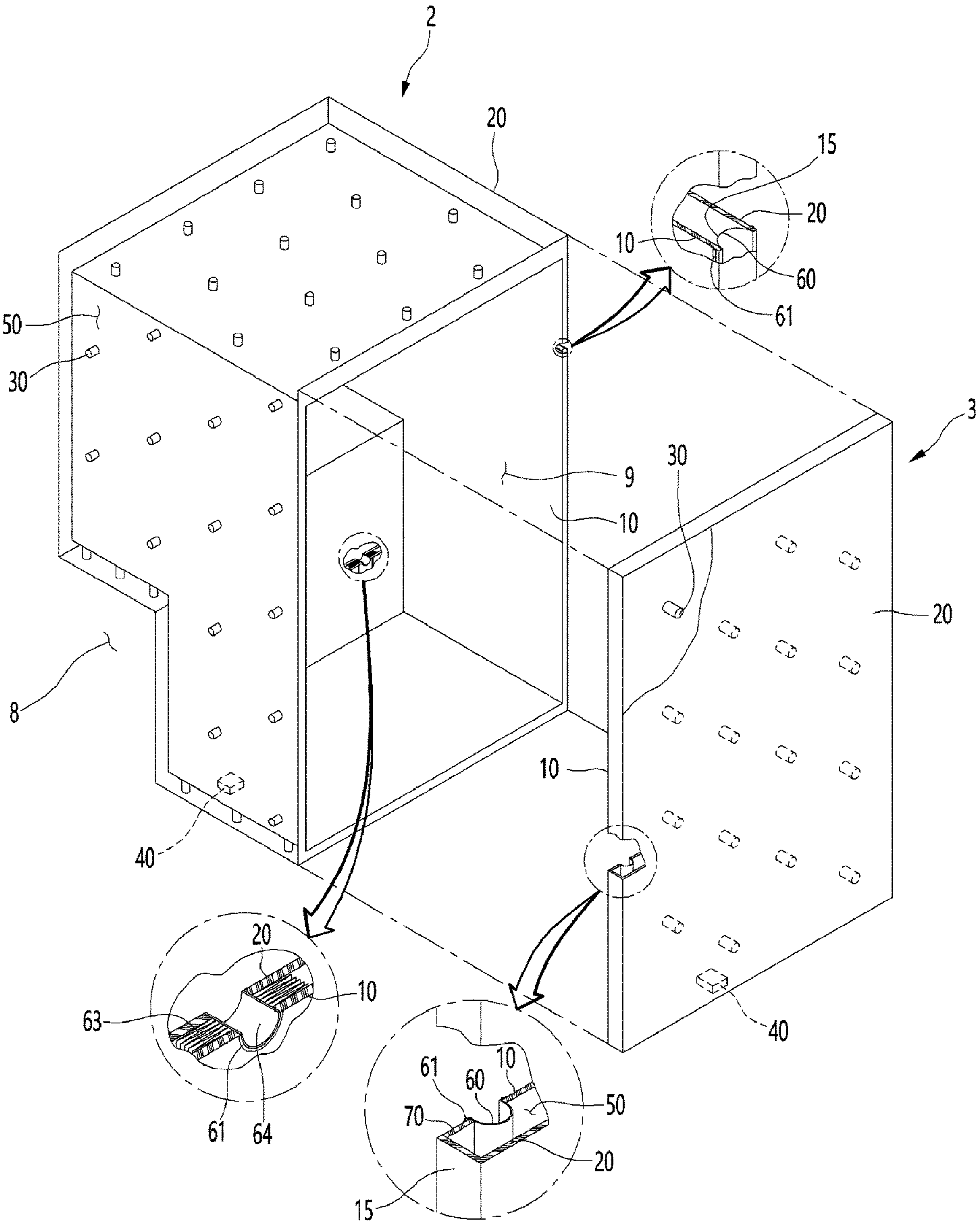
FIG. 2 is a view schematically illustrating a vacuum adiabatic body used in a main body and a door of the refrigerator.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

Figure 3:
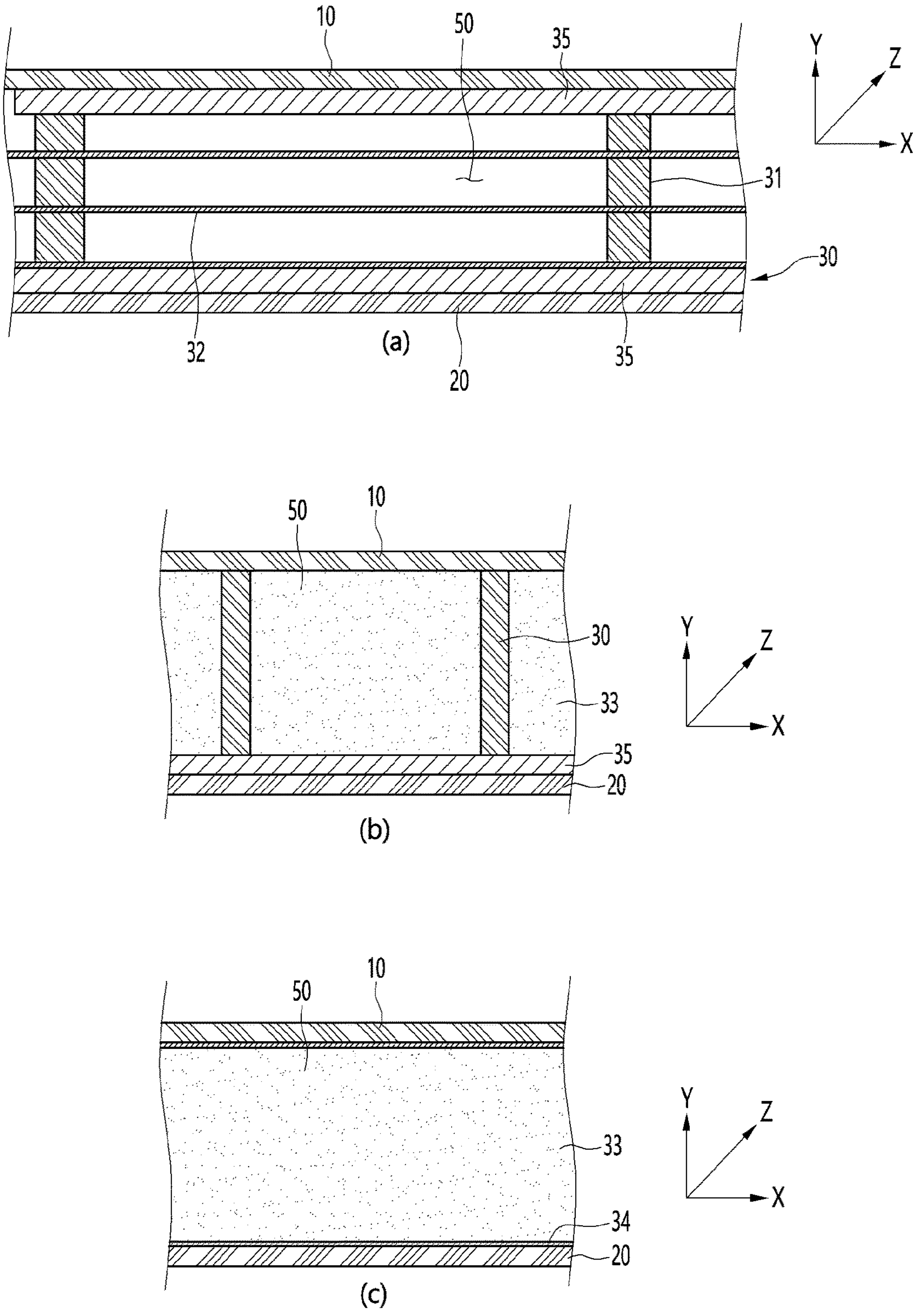
FIG. 3 is a view illustrating an example of a support that maintains a vacuum space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3*a*, as an embodiment, the support may include a bar 31 and a connection plate and support plate 35. The connection plate and the supporting plate may be designed separately. Referring to FIG. 3*b*, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3*c*, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

Figure 4:
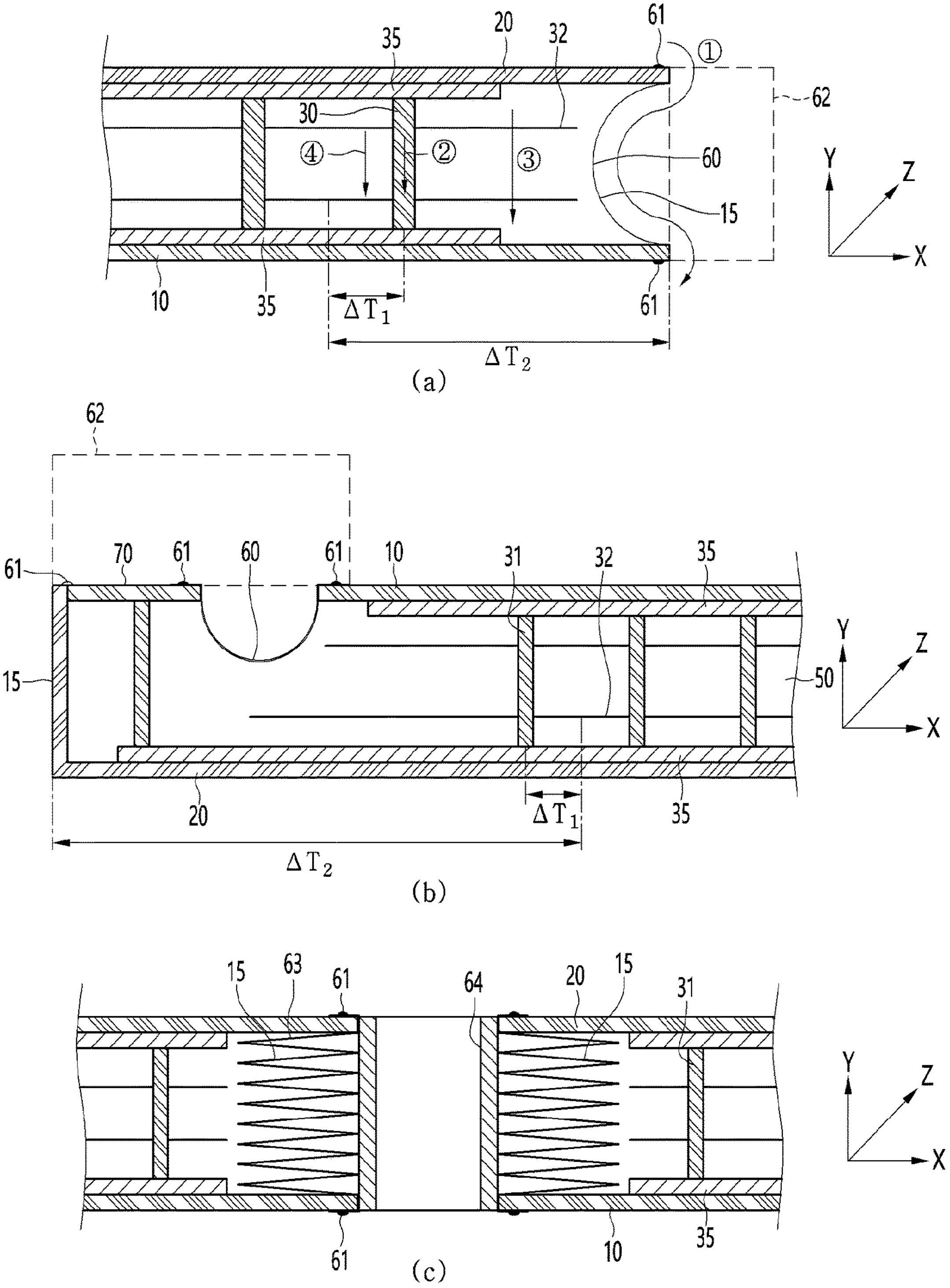
FIG. 4 is a view for explaining an example of the vacuum with respect to a heat transfer resistor.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4*a*, for example, a conductive resistance sheet may be provided on a side plate connecting the first plate to the second plate. Referring to FIG. 4*b*, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4*c*, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

Figure 5:
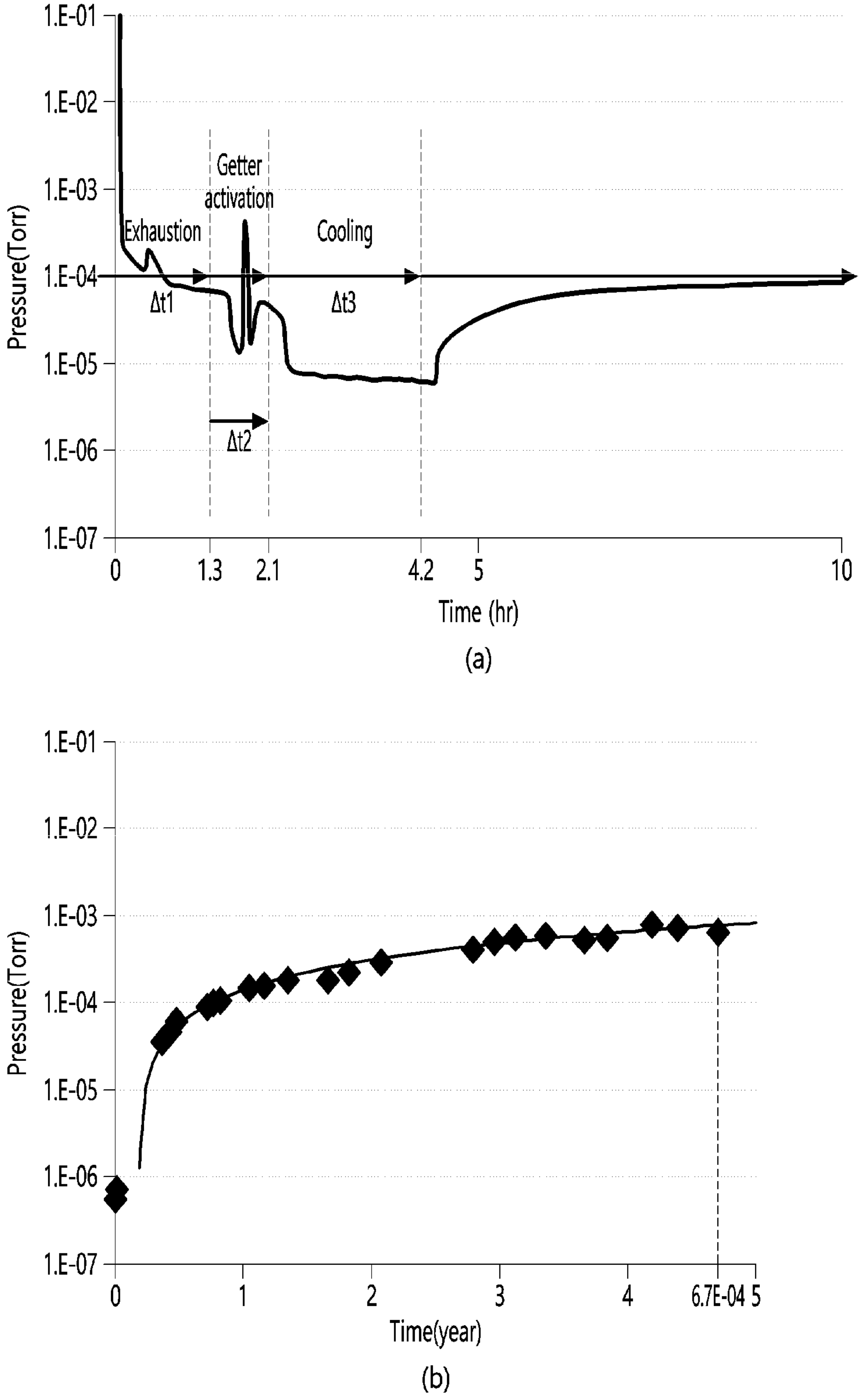
FIG. 5 is a graph illustrating results obtained by observing a process of exhausting the inside of the vacuum adiabatic body with a time and pressure when the support is used.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space. The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time $\Delta\mathbf{1}$ during which the process of heating or drying the vacuum adiabatic body is performed, a time $\Delta t\mathbf{2}$ during which the process of maintaining the getter in the vacuum adiabatic body is performed, of a time $\Delta t\mathbf{3}$ during which the process of cooling the vacuum adiabatic body is performed. Examples of times $\Delta t\mathbf{1}$, $\Delta t\mathbf{2}$, and $\Delta t\mathbf{3}$ are as follows. The present disclosure may be any one of the following examples or a combination of two or more examples. In the vacuum adiabatic body vacuum exhaust process, the time $\Delta t\mathbf{1}$ may be a time t1*a* or more and a time t1*b* or less. As a first example, the time t1*a* may be greater than or equal to about 0.2 hr and less than or equal to about 0.5 hr. The time t1*b* may be greater than or equal to about 1 hr and less than or equal to about 24.0 hr. The time $\Delta t\mathbf{1}$ may be about 0.3 hr or more and about 12.0 hr or less. The time $\Delta t\mathbf{1}$ may be about 0.4 hr or more and about 8.0 hr or less. The time $\Delta t\mathbf{1}$ may be about 0.5 hr or more and about 4.0 hr or less. In this case, even if the $\Delta t\mathbf{1}$ is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time t1*a* may be greater than or equal to about 0.5 hr and less than or equal to about 1 hr. The time t1*b* may be greater than or equal to about 24.0 hr and less than or equal to about 65 hr. The time Δt1 may be about 1.0 hr or more and about 48.0 hr or less. The time Δt1 may be about 2 hr or more and about 24.0 hr or less. The time Δt1 may be about 3 hr or more and about 12.0 hr or less. In this case, it may be the vacuum adiabatic body that needs to maintain the Δt1 as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time Δt1 may be a time t1*a* or more and a time t1*b* or less. The time t2*a* may be greater than or equal to about 0.1 hr and less than or equal to about 0.3 hr. The time t2*b* may be greater than or equal to about 1 hr and less than or equal to about 5.0 hr. The time Δt2 may be about 0.2 hr or more and about 3.0 hr or less. The time Δt2 may be about 0.3 hr or more and about 2.0 hr or less. The time Δt2 may be about 0.5 hr or more and about 1.5 hr or less. In this case, even if the time Δt2 is kept as short as possible, the sufficient outgassing through the getter may be applied to the vacuum adiabatic body. In the vacuum adiabatic body vacuum exhaust process, the time Δt3 may be a time t3*a* or more and a time t3*b* or less. The time t2*a* may be greater than or equal to about 0.2 hr and less than or equal to about 0.8 hr. The time t2*b* may be greater than or equal to about 1 hr and less than or equal to about 65.0 hr. The tine Δt3 may be about 0.2 hr or more and about 48.0 hr or less. The time Δt3 may be about 0.3 hr or more and about 24.0 hr or less. The time Δt3 may be about 0.4 hr or more and about 12.0 hr or less. The time Δt3 may be about 0.5 hr or more and about 5.0 hr or less. After the heating or drying process is performed during the exhaust process, the cooling process may be performed. For example, when the heating or drying process is performed for a long time, the time Δt3 may be long. The vacuum adiabatic body according to the present disclosure may be manufactured so that the time Δt1 is greater than the time Δt2, the time Δt1 is less than or equal to the time Δt3, or the time Δt3 is greater than the time Δt2. The following relational expression is satisfied: $\Delta t2 < \Delta t1 \leq \Delta t3$. The vacuum adiabatic body according to an embodiment may be manufactured so that the relational expression: $\Delta t1 + \Delta t2 + \Delta t3$ may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: $\Delta t1 + \Delta t2 + \Delta t3$ may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E-6 Torr. The minimum value of the vacuum pressure may be greater than about 1.8E-6 Torr and less than or equal to about 1.0E-4 Torr, be greater than about 0.5E-6 Torr and less than or equal to about 1.0E-4 Torr, or be greater than about 0.5E-6 Torr and less than or equal to about 0.5E-5 Torr. The minimum value of the vacuum pressure may be greater than about 0.5E-6 Torr and less than about 1.0E-5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E-5 Torr and less than or equal to about 5.0E-1 Torr. The maintained vacuum pressure may be greater than or equal to about 1.0E-5 Torr and less than or equal to about 1.0E-1 Torr, be greater than or equal to about 1.0E-5 Torr and less than or equal to about 1.0E-2 Torr, be greater than or equal to about 1.0E-4 Torr and less than or equal to about 1.0E-2 Torr, or be greater than or equal to about 1.0E-5 Torr and less than or equal to about 1.0E-3 Torr. As a result of predicting the change in vacuum pressure with an accelerated experiment of two example products, one product may be provided so that the vacuum pressure is maintained below about 1.0E-04 Torr even after about 16.3 years, and the other product may be provided so that the vacuum pressure is maintained below about 1.0E-04 Torr even after about 17.8 years. As described above, the vacuum pressure of the vacuum adiabatic body may be used industrially only when it is maintained below a predetermined level even if there is a change over time.

FIG. 5*a* is a graph of an elapsing time and pressure in the exhaust process according to an example, and FIG. 5*b* is a view explaining results of a vacuum maintenance test in the acceleration experiment of the vacuum adiabatic body of the refrigerator having an internal volume of about 128 liters. Referring to FIG. 5*b*, it is seen that the vacuum pressure gradually increases according to the aging. For example, it is confirmed that the vacuum pressure is about 6.7E-04 Torr after about 4.7 years, about 1.7E-03 Torr after about 10 years, and about 1.0E-02 Torr after about 59 years. According to these experimental results, it is confirmed that the vacuum adiabatic body according to the embodiment is sufficiently industrially applicable.

Figure 6:
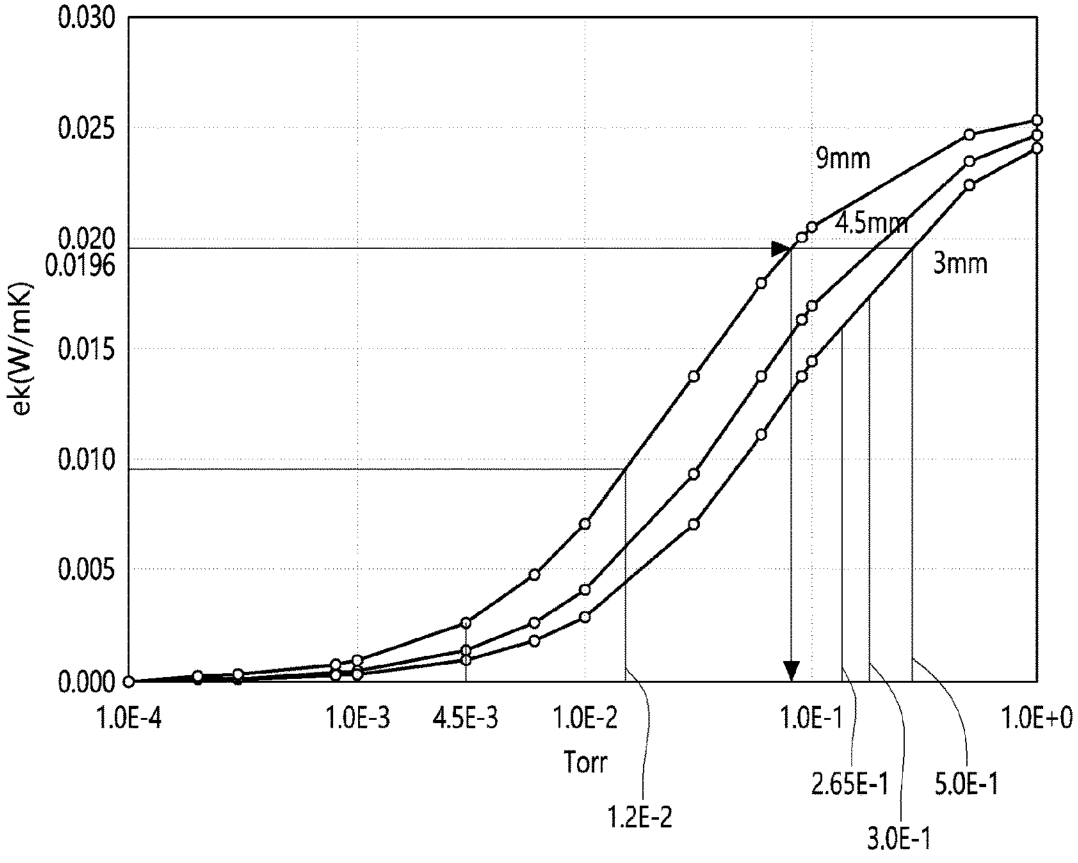
FIG. 6 is a graph illustrating results obtained by comparing a vacuum pressure to gas conductivity.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E-1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E-3 Torr. The vacuum pressure of about 4.5E-3 Torr may be defined as the point at which the reduction in adiabatic effect caused by the gas conduction heat is saturated. Also, when the effective heat transfer coefficient is about 0.01 W/mK, the vacuum pressure is about 1.2E-2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E-1 Torr, or be greater than about 2.65E-1 Torr and less than about 5E-1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E-1 Torr, or be greater than about 1.2E-2 Torr and less than about 5E-1 Torr. As another example, the support may include at least one of a bar, a connection plate, or a support plate, and when the gap of the vacuum space is greater than or equal to about 9 mm, the vacuum pressure may be greater than or equal to A and less than about 1.0×10^-1 Torr or be greater than about 4.5E-3 Torr and less than about 5E-1 Torr. Here, the A may be greater than or equal to about 1.0×10^-6 Torr and less than or equal to about 1.0E-5 Torr. The A may be greater than or equal to about 1.0×10^-5 Torr and less than or equal to about 1.0E-4 Torr. When the support includes a porous material or a filler, the vacuum pressure may be greater than or equal to about 4.7E-2 Torr and less than or equal to about 5E-1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

Figure 7:
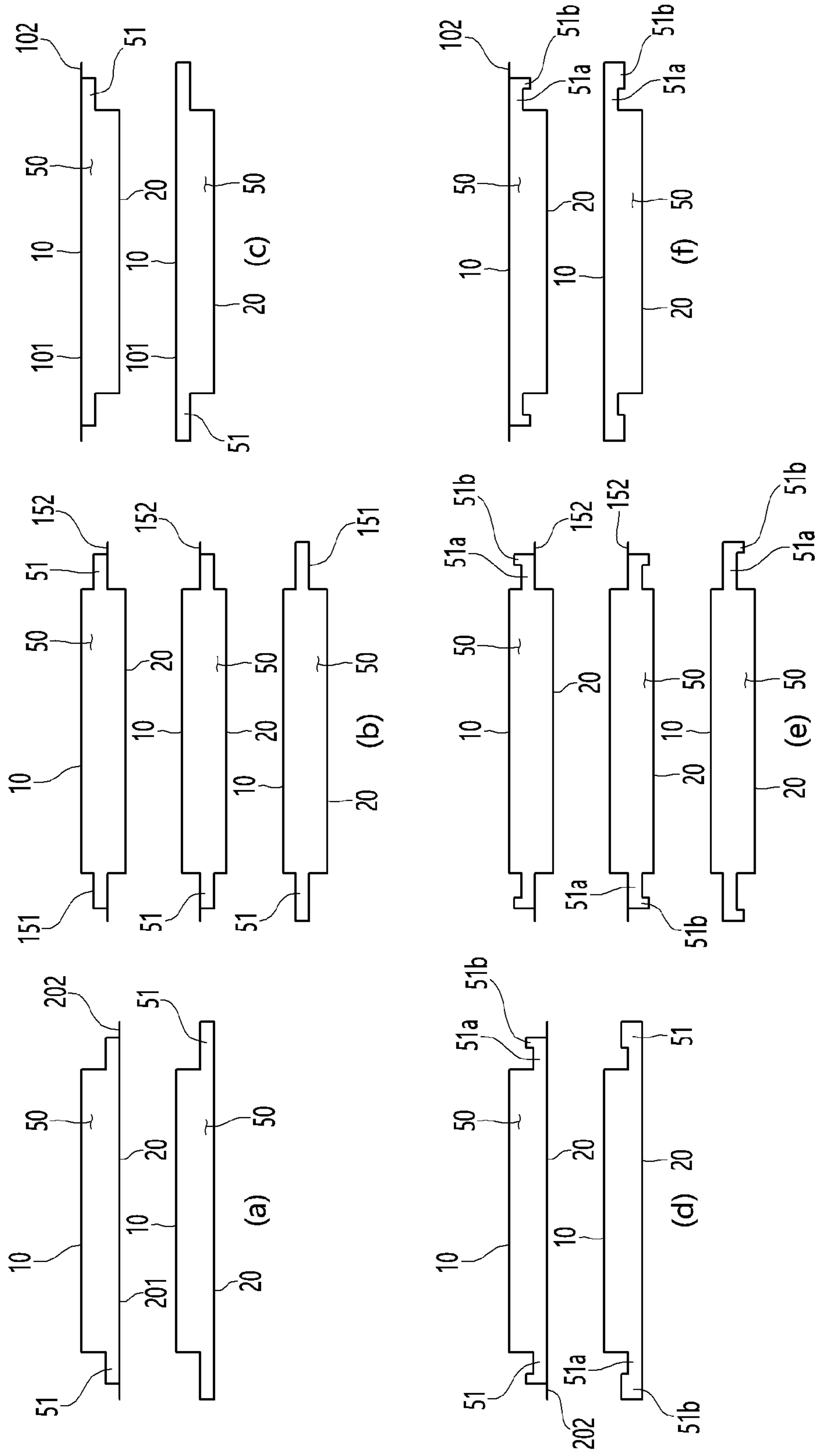
FIG. 7 is a view illustrating various examples of the vacuum space.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7*a*, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7*b*, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7*c*, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG.

7*d*, the vacuum space expansion portion 51 may include an X-direction expansion portion 51*a* and a Y-direction expansion portion 51*b* of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7*e*, the side plate may provide the vacuum space extension portion extending in the plurality of directions. The vacuum space expansion portion may reinforce the adiabatic performance of the side portion of the vacuum adiabatic body. Referring to FIG. 7*f*, the first plate may provide the vacuum space extension portion extending in the plurality of directions. The vacuum space expansion portion may reinforce the adiabatic performance of the side portion of the vacuum adiabatic body.

Figure 8:
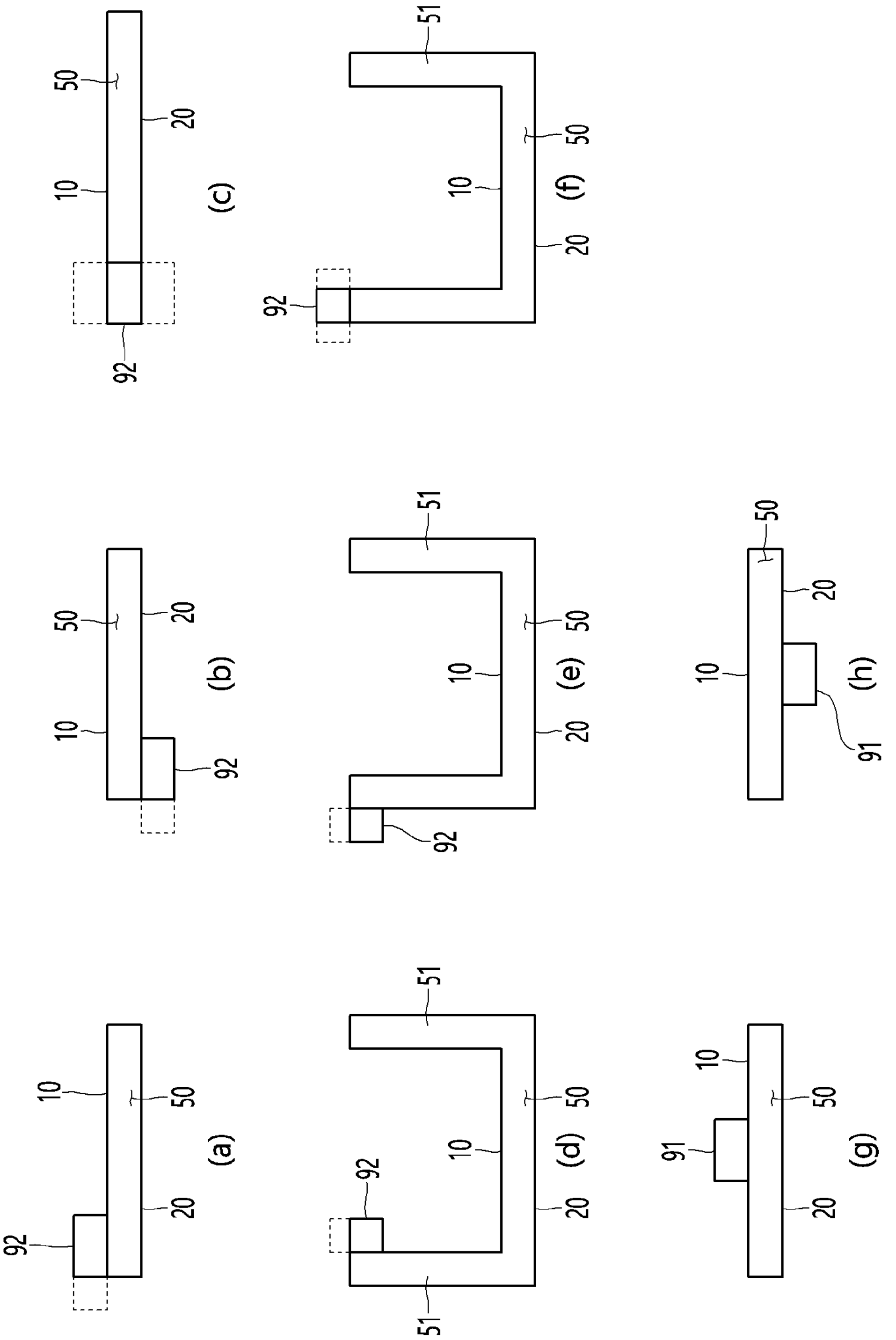
FIG. 8 is a view for explaining another adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a pre-molded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8*a* to 8*f*, another adiabatic body may include a peripheral adiabatic body. The peripheral adiabatic body may be disposed on at least a portion of a periphery of the vacuum adiabatic body, a periphery of the first plate, a periphery of the second plate, and the side plate. The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8*g* to 8*h*, another adiabatic body may include a central adiabatic body. The central adiabatic body may be disposed on at least a portion of a central portion of the vacuum adiabatic body, a central portion of the first plate, or a central portion of the second plate.

Referring to FIG. 8*a*, the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8*b*, the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate. Referring to FIG. 8*c*, the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8*d*, the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8*e* and 8*f*, in the peripheral adiabatic body, the vacuum space extension portion may be disposed on a periphery of the second plate or the side plate. The same explanation as in FIG. 8*d* may be applied. Referring to FIG. 8*g*, the central adiabatic body 91 may be placed on a central portion of the first plate. The central adiabatic body may improve adiabatic performance of the central portion of the first plate. Referring to FIG. 8*h*, the central adiabatic body may be disposed on the central portion of the second plate. The central adiabatic body may improve adiabatic performance of the central portion of the second plate.

Figure 9:
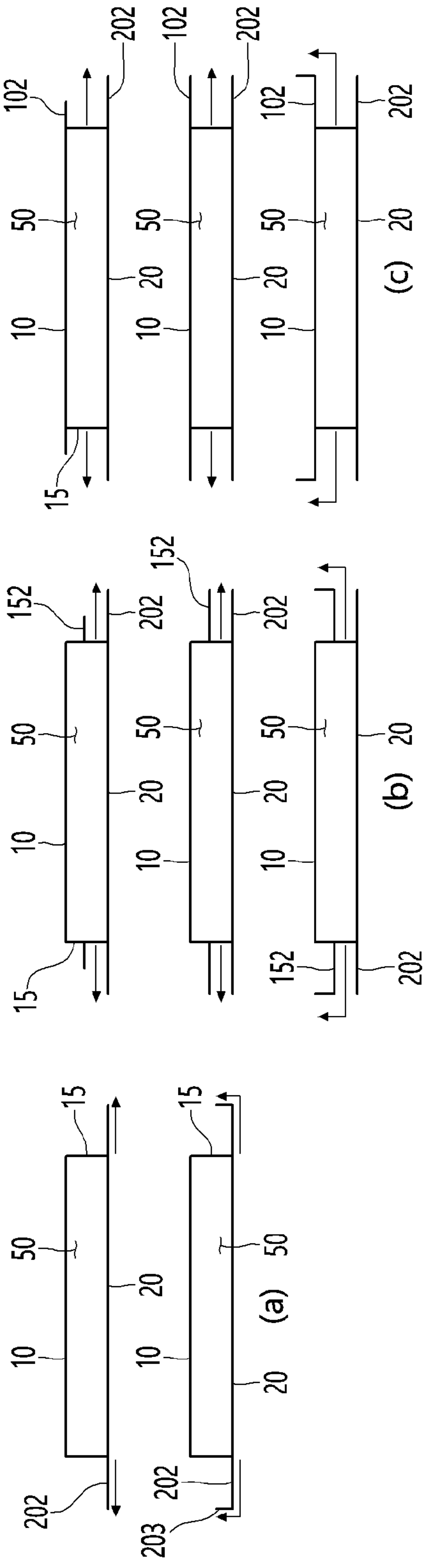
FIG. 9 is a view for explaining a heat transfer path between first and second plates having different temperatures.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9*a*, the second plate may include the extension portion extending to the periphery of the second plate. Here, the extension portion may further include a portion extending backward. Referring to FIG. 9*b*, the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9*c*, the first plate may include the extension portion extending to the periphery of the first plate. Here, the extension portion may extend to a length that is less than or equal to that of the extension portion of the second plate. Here, the extension portion may further include a portion extending backward.

Figure 10:
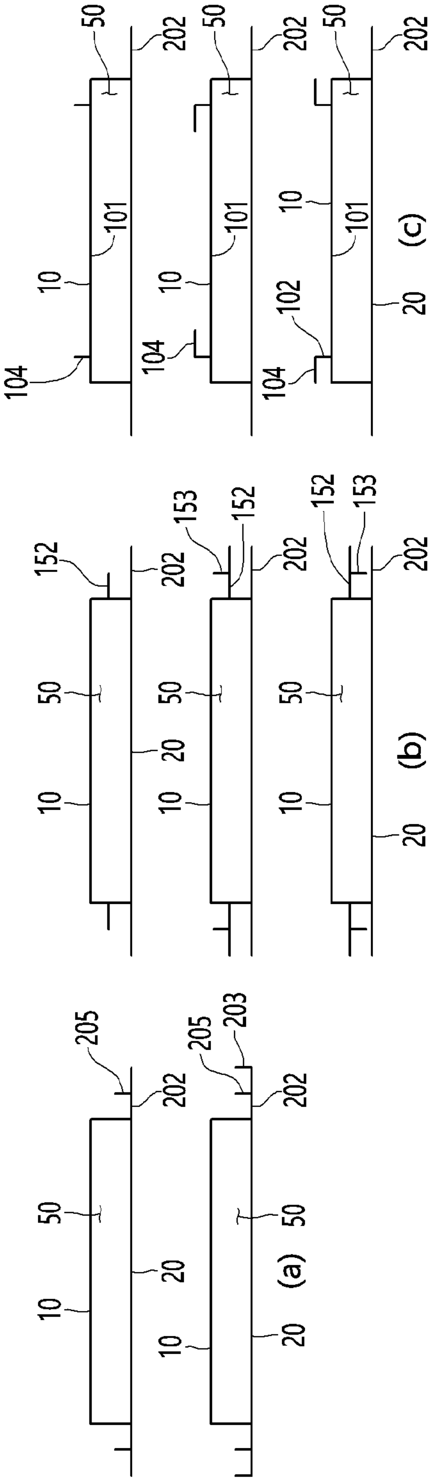
FIG. 10 is a view for explaining a branch portion on the heat transfer path between first and second plates having different temperatures.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10*a*, the second plate may include the branched portion 205. The branched portion may be provided in plurality, which are spaced apart from each other. The branched portion may include a third portion 203 of the second plate. Referring to FIG. 10*b*, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10*c*, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10*a*, 10*b*, and 10*c* may be the same as at least one of the extension directions of the extension portion described in FIG. 10.

Figure 11:
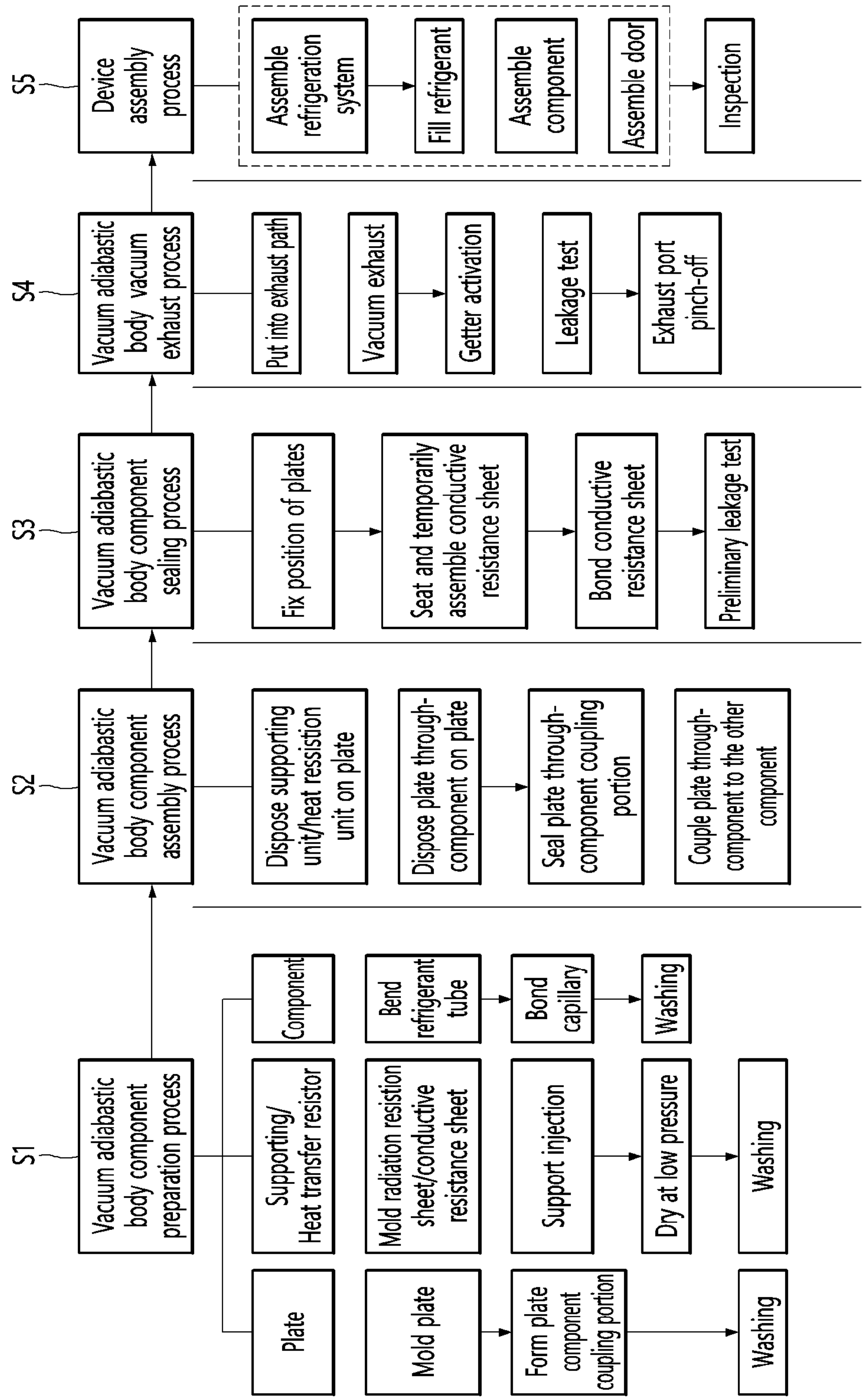
FIG. 11 is a view for explaining a method for manufacturing a vacuum adiabatic body.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured.

Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with a heat transfer resistor is as follows. The present disclosure may be any one of the following examples or a combination of two or more examples. The vacuum adiabatic body component preparation process may include a process of manufacturing the heat transfer resistor. Before the vacuum adiabatic body vacuum exhaust process is performed, the process of manufacturing the heat transfer resistor may be performed. The heat transfer resistor may be manufactured by a metal sheet. Optionally, before the vacuum adiabatic body vacuum exhaust process is performed, the process of washing the heat transfer resistor may be performed. Optionally, before the vacuum adiabatic body vacuum exhaust process is performed, a process of providing the component coupling portion to a portion of the heat transfer resistor may be performed. Optionally, the process of providing the component coupling portion may include a process of manufacturing a tube provided to the component coupling portion. The tube may be connected to a portion of the heat transfer resistor. The tube may be disposed in an empty space provided in the heat transfer resistor or in an empty space provided between the heat transfer resistors. Optionally, the process of providing the component coupling portion may include a process of providing a through-hole in a portion of the heat transfer resistor. Optionally, the process of providing the component coupling portion may include a process of providing a curved portion to at least one of the heat transfer resistor or the tube.

Optionally, during the vacuum adiabatic body vacuum exhaust process is performed, the process of deforming the heat transfer resistor may be performed. An example of the process of deforming the heat transfer resistor may be applied to the process of deforming the plate. An example of the process of deforming the heat transfer resistor may be applied when at least a portion of the plate and the heat transfer resistor are integrated with each other. Examples of the process of deforming the heat transfer resistor are as follows. The present disclosure may be any one of the following examples or a combination of two or more examples. First, the process may include a process in which the heat transfer resistor is recessed in a direction toward the internal space or toward the outside of the internal space. Therefore, a heat transfer path may extend to reduce a degree of heat conduction through the heat transfer resistor. Second, the process may include a process of changing a curvature radius of the heat transfer resistor. For example, the process of changing the curvature radius may include changing the curvature radius in at least a portion of a central portion and a peripheral portion of the heat transfer resistor. As another example, the process of changing the curvature radius may include a process of changing the curvature radius in the vicinity of an empty space provided inside the support, or a process of changing the curvature radius in the vicinity of an empty space provided to the outside of an edge of the support. As another example, the process of deforming the curvature radius may include a process of providing the heat transfer resistor to a portion, which is not in contact with the support. As another example, the process of changing the curvature radius may include a process of changing a curvature radius at at least a portion of the first portion or the second portion of the heat transfer resistor. Here, the first portion of the heat transfer resistor may be a portion defining a vacuum space. The second portion of the heat transfer resistor may be a portion extending in a direction away from the first portion to the vacuum space. Third, the process may include a process of changing a thickness of the heat transfer resistor. For example, the process of changing the thickness may include a process of changing a thickness at the portion supported by the support. As another example, the process of changing the thickness may include a process of changing a thickness in the vicinity of the empty space provided inside the support. As another example, the process of changing the thickness may include a process of changing a thickness in the vicinity of the empty space provided outside the edge of the support. As another example, the process of changing the thickness may include a process of providing the heat transfer resistor to a portion that is not in contact with the support. After the process of changing the curvature radius or the thickness in the central portion of the heat transfer resistor is performed, the process of changing the curvature radius or the thickness in the peripheral portion of the heat transfer resistor may be performed. After the process of changing the curvature radius or the thickness is performed in the vicinity of the empty space provided inside the support, the process of changing the curvature radius in the vicinity of the empty space provided outside the edge of the support may be performed. After the process of changing the curvature radius or the thickness in the first portion of the heat transfer resistor is performed, the process of changing the curvature radius or the thickness in the second portion of the heat transfer resistor may be performed. The process of deforming the heat transfer resistor while the vacuum adiabatic body exhaust process is performed may also be applied to the plate, and the same description will be omitted.

The process associated with the heat transfer resistor may optionally include a process related to the process of washing the heat transfer resistor. An example of a process sequence associated with the process of washing the heat transfer resistor is as follows. The present disclosure may be any one of the following examples or a combination of two or more examples. After the process of manufacturing the heat transfer resistor is performed, at least one of the process of manufacturing the heat transfer resistor and the process of washing the heat transfer resistor may be performed. After the process of manufacturing the heat transfer resistor is performed, the process of washing the heat transfer resistor may be performed. Before the process of manufacturing the heat transfer resistor is performed, the process of washing the heat transfer resistor may be performed. After the process of manufacturing the heat transfer resistor is performed, at least one of a process of providing the component coupling portion to a portion of the heat transfer resistor or the process of washing the heat transfer resistor may be performed. After the process of providing the component coupling portion to a portion of the heat transfer resistor is performed, the process of washing the heat transfer resistor may be performed.

The process associated with the heat transfer resistor may optionally include a process related to the process of providing the component coupling portion to the heat transfer resistor. An example of a process sequence related to the process of providing the component coupling portion to the heat transfer resistor is as follows. The present disclosure may be any one of the following examples or a combination of two or more examples. After the process of providing the through-hole in a portion of the heat transfer resistor is performed, at least one of a process of providing a curved portion to the heat transfer resistor, a process of providing a curved portion to the tube, or a process of providing a seal between the heat transfer resistor and the tube may be performed. After the process of providing the curved portion to at least a portion of at least one of the heat transfer resistor or the tube is performed, the process of sealing the gap between the plate and the tube may be performed. The process of providing the through-hole in the portion of the heat transfer resistor and the process of providing the curved portion on at least one of the heat transfer resistor or the tube may be performed at the same time. The process of providing the through-hole in a portion of the heat transfer resistor and the process of providing the seal between the heat transfer resistor and the tube may be performed at the same time. After the process of providing the curved portion to the tube connected to the heat transfer resistor is performed, the process of providing the through-hole in the portion of the heat transfer resistor may be performed. Before the vacuum adiabatic body vacuum exhaust process is performed, a portion of the tube may be provided and/or sealed to the heat transfer resistor, and after the vacuum adiabatic body vacuum exhaust process is performed, the other portion of the tube may be sealed.

The process associated with the heat transfer resistor may optionally include a process related to the process of providing the heat transfer resistor on at least a portion of the plate. An example of a process sequence related to the process of providing the heat transfer resistor to at least a portion of the plate is as follows. The present disclosure may be any one of the following examples or a combination of two or more examples. Before the vacuum adiabatic body exhaust process is performed, the heat transfer resistor may be connected to at least one of the first plate or the second plate. Before the vacuum adiabatic body exhaust process is performed, the heat transfer resistor may be disposed in a heat conduction path, through which a fluid flows along the internal space. Before the vacuum adiabatic body exhaust process is performed, the heat transfer resistor may be provided in a space between the first plate and the second plate. Before the vacuum adiabatic body exhaust process is performed, the heat transfer resistor may be provided at the inside of the plate or the surface of the plate. Before the vacuum adiabatic body exhaust process is performed, the heat transfer resistor may be disposed to be supported by at least a portion of the plate. Before the vacuum adiabatic body vacuum exhaust process is performed, the heat transfer resistor may be disposed to be supported by the support.

When at least a portion of the heat transfer resistor is used to be integrated with the plate, the example of the process associated with the heat transfer resistor may also be applied to the example of the process of the plate.

Figure 12:
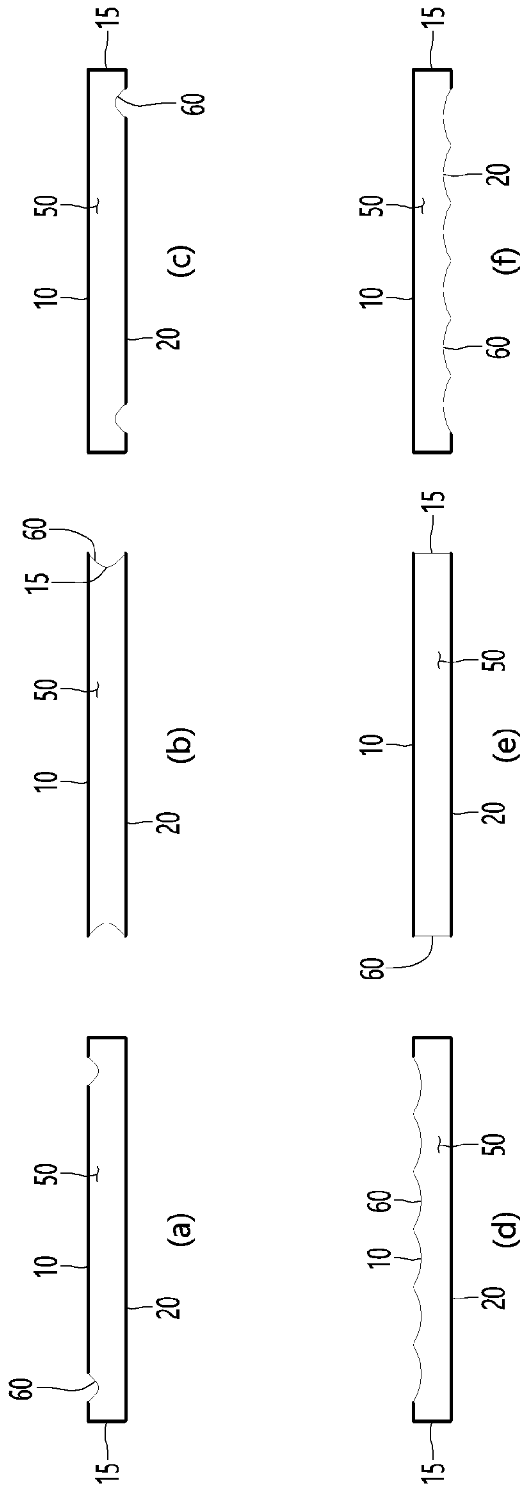
FIG. 12 is a view for explaining a conductive resistance sheet placed on a heat transfer path.

Referring to FIG. 12, the vacuum adiabatic body according to the present invention includes a heat transfer path formed between the plates having different temperatures, and optionally, the heat transfer path may include a portion passing through the heat transfer resistor. An example of the heat transfer resistor as the heat transfer path is as follows. The present disclosure may be any one of the following examples or a combination of two or more examples. The heat transfer resistor may be provided to be integrated with at least one of the first or second plate. The heat transfer resistor may be provided to be integrated with any one of the first and second plates. The heat transfer resistor may be provided as any one of the first and second plates. The heat transfer resistor may be provided as a portion of any one of the first and second plates. The heat transfer resistor may be provided as a component separated from the other one of the first and second plates. In this case, optionally, the heat transfer resistor may be provided to be coupled or sealed to the other one of the first and second plates. The heat transfer resistor may include a portion having a degree of heat transfer resistance, which is greater than that of at least a portion of the other one of the first and second plates. The heat transfer resistor may include a portion having a thickness less than that of at least a portion of the other one of the first and second plates. The heat transfer resistor may include a portion having a curvature radius less than that of at least a portion of the other one of the first and second plates. The heat transfer resistor may include a portion having a curvature radius less than that of at least a portion of the other one of the first and second plates.

Referring to FIG. 12*a*, the heat transfer resistor 60 may be provided on the first plate 10. The heat transfer resistor may be at least one of a radiation resistance sheet, a porous material, a filler, or a conductive resistance sheet. More preferably, the heat transfer resistor may be the conduction resistance sheet. A shield portion for thermal insulation or a member for reinforcing strength may be provided on an outer surface of the heat transfer resistor. The heat transfer resistor may be installed in two opposite peripheral portions of the vacuum space 50. The heat transfer resistor may be installed to be connected to two opposite edges of the vacuum space. Referring to FIG. 12*b*, the heat transfer resistor may be provided on the side plate. Referring to FIG. 12*c*, the heat transfer resistor may be provided on the second plate. In FIGS. 12*b* and 12*c*, the relationship between the plate and the heat transfer resistor is the same as that of FIG. 12*a*. Referring to FIG. 12*d*, the heat transfer resistor may be provided to be integrated with the first plate. In this case, the heat transfer resistor may be provided as the first plate or may be provided as a portion of the first plate. Referring to FIG. 12*e*, the heat transfer resistor may be provided to be integrated with the side plate. In this case, the heat transfer resistor may be provided as the side plate or as a portion of the first plate. Referring to FIG. 12*f*, the heat transfer resistor may be provided to be integrated with the second plate. In this case, the heat transfer resistor may be provided as the second plate or as a portion of the second plate.

The vacuum adiabatic body according to the present invention includes a heat transfer path formed between the plates having different temperatures, and optionally, the heat transfer path may include a portion passing through the side plate. An example of the side plate as the heat transfer path is as follows. The present disclosure may be any one of the following examples or a combination of two or more examples. The side plate may be provided to be integrated with at least one of the first or second plate. The side plate may be provided to be integrated with any one of the first and second plates. The side plate may be provided as any one of the first and second plates. The side plate may be provided as a portion of any one of the first and second plates. The side plate may be provided as a component separated from the other of the first and second plates. In this case, optionally, the side plate may be provided to be coupled or sealed to the other one of the first and second plates. The side plate may include a portion having a degree of strain resistance, which is greater than that of at least a portion of the other one of the first and second plates. The side plate may include a portion having a thickness greater than that of at least a portion of the other one of the first and second plates. The side plate may include a portion having a curvature radius less than that of at least a portion of the other one of the first and second plates. FIGS. 12*c* and 12*f* may illustrate an example in which the first plate and the side plate are integrally provided. FIGS. 12*a* and 12*d* may illustrate an example in which the second plate and the side plate are integrally provided. FIGS. 12*b* and 12*e* may illustrate an example in which the side plate is provided as a separate component that is separated from the first plate and the second plate.

The installation of the tube will be schematically described.

Figure 13:
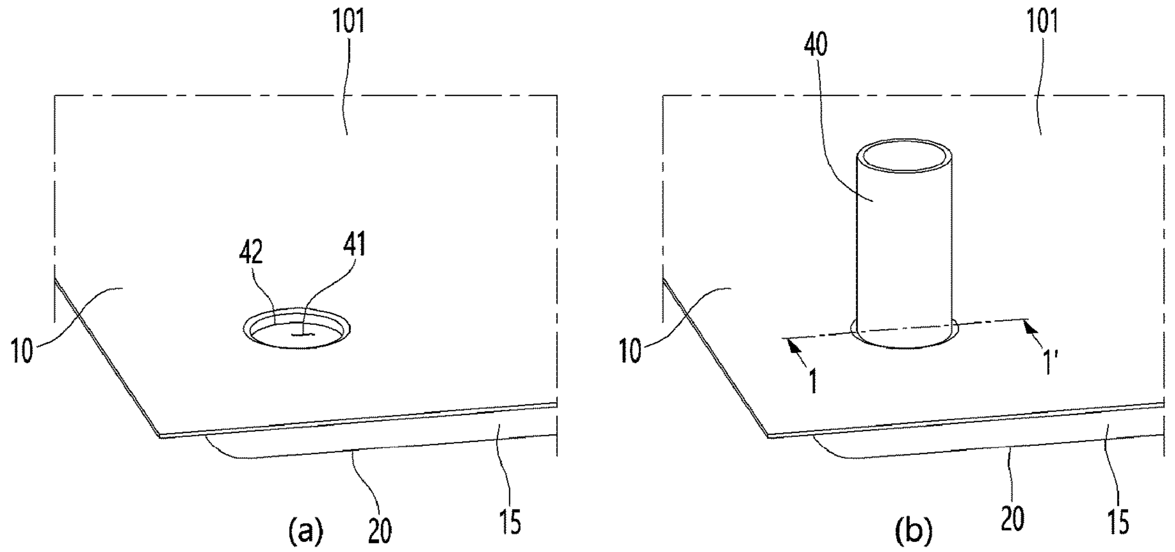
FIG. 13 is an enlarged perspective view illustrating an upper side of a corner portion in which a tube is installed in the vacuum adiabatic body.

FIG. 13 is a perspective view in which a tube is installed in a vacuum adiabatic body. Here, (a) of FIG. 13 is a view illustrating a state before the tube is coupled, and (b) of FIG. 13 is a view illustrating a state after the tube is coupled.

Referring to FIG. 13, the vacuum adiabatic body according to one or more embodiments may have a tube 40. The tube 40 may be a tube for exhausting a fluid of the vacuum space 50. The tube 40 may be a tube for a getter, in which a getter for gas adsorption is supported. The tube 40 may serve as an exhaust port and a getter port.

Optionally, a thickness of the tube may be greater than that of the first plate 10. The thickness of the tube may be provided to be thicker than that of the second plate 20. The thickness of the tube may be provided to a thickness that is sufficient to withstand compression required for sealing the tube. The sealing may be performed through pinch-off. The tube may have a sufficient wall thickness. Since the tube is a soft material, it is necessary to increase in wall thickness. If the wall thickness is small, it may be torn at the time of sealing or may cause vacuum breakage. Examples of the aforementioned tube may be ports such as an exhaust port or a getter port.

Optionally, the tube may be provided as a circular or oval hollow tube made of a metal. The tube may be sealed after the exhaust or after inserting the getter. The tube may be sealed through pressure welding. The tube may be sealed by deforming the tube. The tube may be sealed through pinching-off. The tube may be made of copper (CU) for easy deformation. Copper having strength less than that of stainless steel may be used as the tube. Since the easily deformable copper is used, the pinch-off process may be smoothly performed. In addition, it is possible to reliably provide the seal. Examples of the aforementioned tube may be ports such as an exhaust port or a getter port.

Optionally, the tube 40 may be inserted into the first plate 10. At least a portion of the tube 40 may be inserted into the vacuum space 50. At least a portion of the tube 40 may be in contact with the first plate 10. The tube 40 may be provided at the peripheral portion of the vacuum adiabatic body. A through-hole 41 for inserting the tube may be defined in the first plate 10. A flange 42 to which the tube 40 is coupled may be processed at the peripheral portion of the through-hole 41. The flange 42 may be provided to be integrated with the first plate 10. The flange 42 may be provided by a burr of the through-hole 41. The through-hole 41 may have the same shape as an outer shape of the tube 40. Examples of the aforementioned tube may be ports such as an exhaust port or a getter port.

Optionally, the flange 42 may have a predetermined height portion HL extending in a height direction of the vacuum space. The curvature portion may guide the tube 40. The curvature portion may allow the tube to be conveniently inserted into the through-hole 41. At least a portion of the height portion may provide a contact portion with the tube 40. At least a portion of the tube 40 may be in contact with and/or coupled to the height portion. The tube 40 may be guided to the flange 42. The tube may extend in the height direction of the vacuum space 50. Examples of the aforementioned tube may be ports such as an exhaust port or a getter port.

Figure 14:
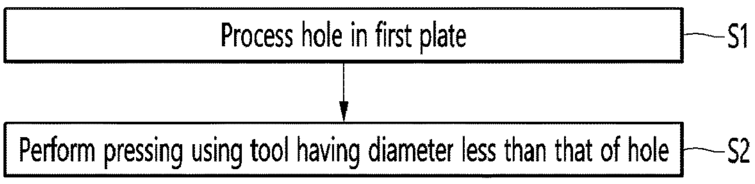
FIG. 14 is a view for explaining a method of processing a through-hole of the first plate.

FIG. 14 is a view for explaining a method of processing the through-hole of the first plate.

Referring to FIG. 14, a hole may be processed in the first plate 10 (S1). Thereafter, the hole may be pressed using a pressing tool having a diameter greater than that of the hole (S2).

Optionally, a size of the hole may be less than the diameter of the through-hole 41. When the through-hole 41 has a circular shape, the hole may be provided in a circular shape. A diameter of a piercing tool for processing the hole may be less than an outer diameter of the tube 40 by 3 mm or less. A height of the flange 42 may be about 3 mm or less. The pressing tool and the hole may have the same geometric center, and a pressing process may be performed. The pressing tool may use the same diameter as the outer diameter of the tube 40. The pressing process may be a burring process. A burr may be provided in the burring process. In the pressing process, a peripheral portion of the hole may be stretched by a predetermined length to form the flange 42. The burr 402 may provide the flange 42. Examples of the aforementioned tube may be ports such as an exhaust port or a getter port.

Optionally, to smoothly form the flange 42 in the burring process, the following method may be applied. It may provide small force compared to the force applied in the general burring process. The force may be applied gradually for a longer time than that required for the general burring process. A first curvature may be processed in the periphery portion of the hole provided by the piercing process between the piercing process and the burring process. During the burring process, a support having a groove corresponding to a desired shape of the burr may be provided on a surface on which the burr is generated. It may provide the flange 42 having a small curvature radius R through the above process. A portion at which the curvature radius is formed may be referred to as a curvature portion. Examples of the aforementioned tube may be ports such as an exhaust port or a getter port.

Figure 15:
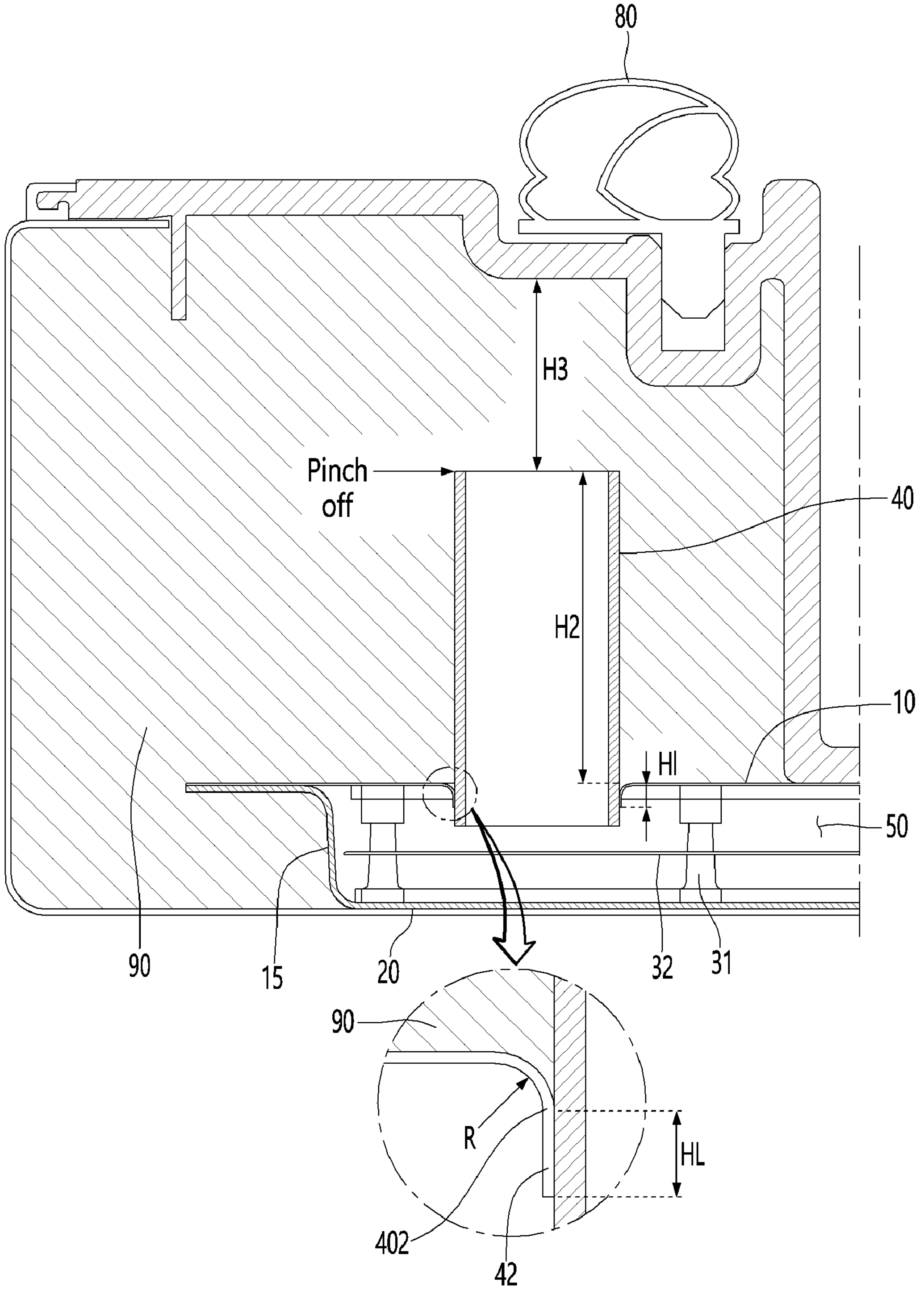
FIG. 15 is a cross-sectional view taken along line 1-1' of FIG. 13*b*.

FIG. 15 is a cross-sectional view taken along line 1-1' of FIG. 12*b*. For reference, FIG. 15 illustrates a state in which the vacuum adiabatic body is applied to a door. A cross-section of the tube and its related configuration will be described with reference to FIG. 15.

In one or more embodiments, the first plate 10 may have a thickness of at least about 0.1 mm or more. Thus, it may secure rigidity to obtain process stability when inserting the tube 40. The thickness of the first plate 10 may be about 0.1 mm. The second plate 20 may have a thickness of about 0.5 mm or more. The thin first plate 10 may be provided because conductive heat decreases. If the first plate 10 is thin, there may be a disadvantage that it is vulnerable to deformation. When the tube 40 is inserted into the through-hole 41, the first plate 10 in the vicinity of the through-hole 41 may be deformed. In this case, there may be a high possibility that the first plate 10 is in contact with the heat transfer resistor 32 to cause a heat loss. Here, an example of the heat transfer resistor described with reference to FIG. 15 may be a radiation resistance sheet. Examples of the aforementioned tube may be ports such as an exhaust port or a getter port.

A height H1 of the flange 42 may be provided to be about 1 mm or more and about 3 mm or less. When the height of the flange 42 exceeds about 3 mm, there is a high risk that the heat transfer resistor 32 and the flange 42 are in contact with each other. If the height of the flange 42 exceeds about 3 mm, the first plate 10 may be torn during the pressing process, and thus, there may be a high possibility that the flange is torn. If there is a processing error of the flange, these limitations may be more serious. If the height of the flange is less than about 1 mm, a contact surface may decrease when brazing the tube and the flange, and thus, there may be a high risk of vacuum leakage. If the height of the flange is less than about 1 mm, coupling strength between the tube and the flange may be weakened, and thus, there may be a high possibility that the coupling part is damaged. A filler metal may be injected into the contact surface. Examples of the aforementioned tube may be ports such as an exhaust port or a getter port.

Optionally, the curvature radius R of the curvature portion of the flange 42 defining the through-hole 41 may be less than that of each of all bent portions provided on the first plate 10. The curvature radius R of the flange 42 defining the through-hole 41 may be less than that of each of all bent portions provided on the second plate 20. The curvature radius R of the flange 42 defining the through-hole 41 may be less than that of each of all bent portions provided on the side plate 15. A length of the height portion HL of the flange 42 may increase by reducing the curvature radius of the flange 42. The height portion HL of the flange 42 may be a portion at which the tube 40 and the flange 42 are bonded to each other through brazing. A large contact area between the tube 40 and the flange 42 may be secured by allowing the length of the height portion HL of the flange 42 to increase. Examples of the aforementioned tube may be ports such as an exhaust port or a getter port.

Optionally, the tube may be insulated with the additional adiabatic body 90. The additional adiabatic body 90 may insulate a gap between the tube 40 and the first space and/or a gap between the tube 40 and the second space. The tube 40 may not have access to the plate containing the additional adiabatic body 90. The tube 40 may have high thermal insulation performance as being spaced apart from the plate. This is because the tube 40 is made of copper having high thermal conductivity. Examples of the aforementioned tube may be ports such as an exhaust port or a getter port.

The deformation of the seal of the tube 40 may be propagated along the tube 40 to a bonding portion of the tube 40 and the flange 42. In this case, the bonding portion may be damaged. The bonding portion may have the first plate 10 having low rigidity as one bonding surface. For this reason, there may be a greater risk of damage to the bonding portion. It may reduce the insulation loss through the tube 40 by providing the optimal length of the tube 40. It may prevent the bonding portion from being damaged by providing the optimal length of the tube 40. Examples of the aforementioned tube may be ports such as an exhaust port or a getter port.

Optionally, a height H2 of the tube 40 protruding from the first plate 10 may be at least twice the diameter of the tube 40. In this case, the deformation of the seal of the tube 40 may not be transmitted to the bonding portion. In this case, even when the seal is formed, the tube 40 may be maintained in its original shape at the bonding portion. It may be the case that the tube 40 does not have a circular shape. In this case, the height of the tube may mean more than twice a mean diameter of the tube 40. Here, the mean diameter may mean a mean distance from the geometric center of the cross-section of the tube to an edge of the cross-section of the tube. The tube 40 may extend obliquely in the height direction of the vacuum space 50. In this case, the distance from the seal of the tube to the point closest to the first plate 10 may be twice the diameter of the tube 40 or more. Examples of the aforementioned tube may be ports such as an exhaust port or a getter port.

Optionally, it may have an end of the tube 40 protruding from the first plate 10. The end may not be in contact with an outer surface or boundary of the additional adiabatic body 90. The tube 40 may extend in the height direction in the vacuum state. In this case, the tube 40 and the gasket 80 may be vertically aligned. A heat conduction path between the end of the tube 40 and an adjacent portion of the gasket 80 may be generated to increase the insulation loss. A distance H3 from the end of the tube 40 to the outer surface or boundary of the additional adiabatic body 90 may be about 20 mm or less. The height H2 of the tube 40 protruding from the first plate 10 may be greater than a distance H3 from the end of the tube 40 to the boundary of the additional adiabatic body 90. Examples of the aforementioned tube may be ports such as an exhaust port or a getter port.

Optionally, the sum of the height H2 of the tube 40 protruding from the first plate 10 and the distance H3 from the end of the tube 40 to the boundary of the additional adiabatic body 90 may be provided to be greater than the height of the vacuum space 50. The vacuum space 50 may be provided to be about 10 mm or more and about 20 mm or less. Examples of the aforementioned tube may be ports such as an exhaust port or a getter port.

Optionally, the flange 42 may face the vacuum space 50. Thus, the flange 42 may guide the insertion of the tube 40. In addition, the operator may conveniently insert the tube 40. In another embodiment, the flange 42 may be directed to the outside of the vacuum space 50. Examples of the aforementioned tube may be ports such as an exhaust port or a getter port.

Figure 16:
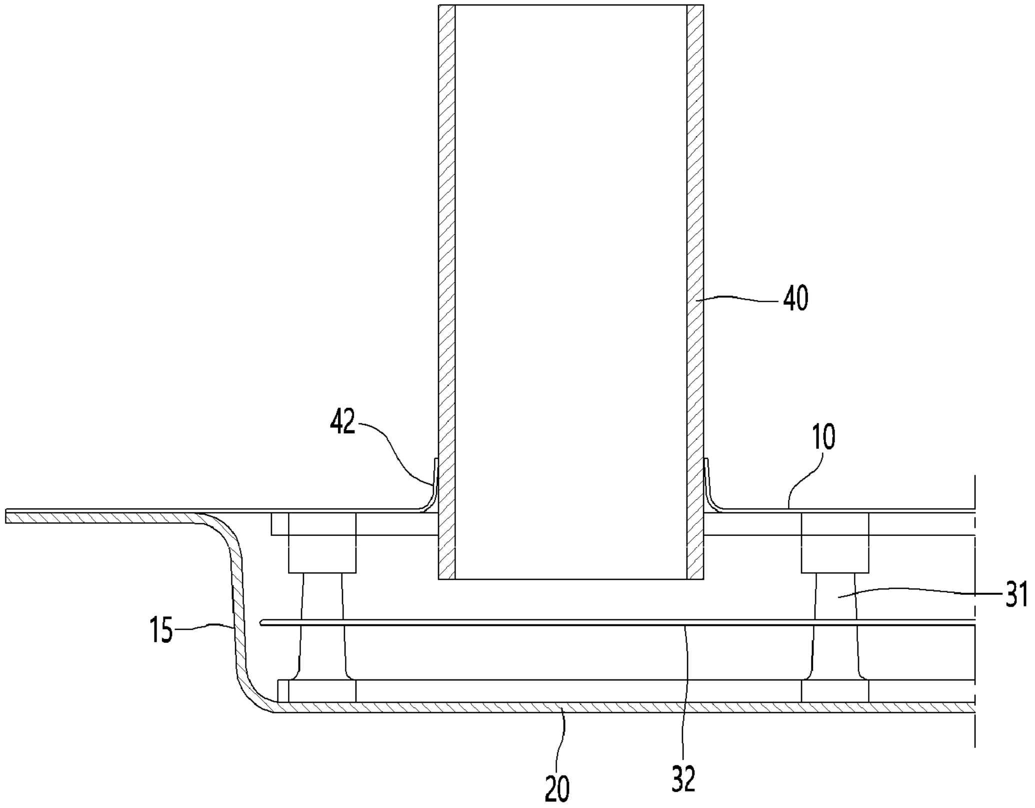
FIG. 16 illustrates an example in which a flange extends toward the outside of the vacuum space.

FIG. 16 illustrates an embodiment in which the flange extends toward the outside of the vacuum space. In one or more other embodiments, the flange 42 may extend to the outside of the vacuum space 50. The flange 42 may extend toward the first space.

Optionally, the end of the flange 42 may not be in contact with the heat transfer resistor 32. The heat transfer resistor may be freely installed inside the vacuum space 50 without interference of the flange 42. The heat transfer resistor 32 may be installed adjacent to or in contact with the first plate 10. The support 30 may be installed without the interference of the flange 42. The interference, contact, and adjacency between the respective heat transfer resistors 32, 33, 60, and 63 placed in the vacuum space 50 and the flange 42 may be prevented from occurring. Thus, a degree of freedom in design may increase, and the heat conduction may decrease. Here, the interference may mean that the product design is difficult because the regions of the components overlap each other during the design. The contact may mean that the components are in contact with each other, and the insulation loss increases rapidly. The adjacency may refer to the intervening of an additional insulating material due to the occurrence of thermal insulation loss due to adjacent components.

In an embodiment, the vacuum adiabatic body may include a seal that seals a gap between the first plate 10 and the second plate 20 to provide a first plate 10 having a first temperature, a second plate 20 having a second temperature different from the first temperature, and a vacuum space 50. Optionally, the vacuum adiabatic body may include a component coupling portion provided on at least a portion of the first plate and the second plate to couple the components to each other. Optionally, the vacuum adiabatic body may include a heat transfer resistor provided to reduce a heat transfer amount between a first space provided in the vicinity of the first plate and a second space provided in the vicinity of the second plate. Optionally, the vacuum adiabatic body may be manufactured through a vacuum adiabatic body component preparation process of preparing the first plate and the second plate in advance, a vacuum adiabatic body component assembly process of assembling the prepared first and second plates with each other, and a vacuum adiabatic body vacuum exhaust process of discharging a gas within a space defined between the first plate and the second plate after the component assembly process. Optionally, before the vacuum adiabatic body vacuum exhaust process, the vacuum adiabatic body may be manufactured in a vacuum adiabatic boy component sealing process, in which the space between the first plate and the second plate is sealed. Optionally, after the vacuum adiabatic body vacuum exhaust process, a device assembly process in which the vacuum adiabatic body and components constituting the device may be coupled to each other may be performed.

Optionally, the component coupling portion may include a through-hole 41 provided in at least a portion of the plate. The present disclosure may be any one of the following examples or a combination of two or more examples. The through-hole may provide a path through which a fluid moves in at least one of the vacuum adiabatic body vacuum exhaust process or after the vacuum exhaust process is completed. The through-hole may be a through-hole for an exhaust port or a getter port. When the through-hole is a hole for a getter, the getter may be disposed to overlap at least a portion of the through-hole in a height direction of the vacuum space 50. In this case, a moving speed of a gas adsorbed to the getter may increase. An amount of fluid moving through the through-hole may be reduced or stopped after the vacuum adiabatic body vacuum exhaust process is completed. For example, after the vacuum adiabatic body vacuum exhaust process is completed, at least a portion of the exhaust port or the getter port may be sealed. An example of the sealing may be pressure welding such as pinch-off. The through-hole may be defined in the plate before the vacuum adiabatic body vacuum exhaust process is performed or may be defined in an object connected to the plate. Examples related to the through-hole and the heat transfer resistor are as follows. The heat transfer resistor may include an empty space provided at a position adjacent to the through-hole. An example of the empty space is as follows. The empty space may include a portion provided to overlap at least a portion of the through-hole in the height direction of the vacuum space. In this case, when a fluid is discharged through the empty space, an exhaust speed may increase. The empty space may be provided inside the heat transfer resistor or outside an edge of the heat transfer resistor. The empty space may be provided in a space spaced apart between first and second portions of the heat transfer resistor. The first portion and the second portion may be provided as separate components separated from each other. The empty space may be provided in a space spaced apart between the heat transfer resistor and a component provided outside the edge of the heat transfer resistor. The heat transfer resistor and the component may be provided as separate components separated from each other. The empty space may be provided in the form of another hole. Examples of another hole are as follows. Another hole may be provided in the vicinity of the through-hole.

A circumference area of the through-hole 41 may be less than at least one of circumference areas of another hole, or a circumference diameter of the through-hole may be less than at least one of circumference diameters of another hole. In this case, since another hole increases in size, contact between the heat transfer resistor and other components may be reduced, thereby reducing heat conduction. In another point of view, this example may improve the moving speed of the fluid when another hole is provided as a passage through which the fluid flows. The circumference area of the through-hole may be greater than one half of the circumference area of another hole, or the circumference diameter of the through-hole may be greater than one half of the circumference diameter of another hole. In this example, when the through-hole is a passage through which the fluid flows, a speed at which the fluid flows may increase. The through-hole may be disposed so as not to overlap at least one of other holes in the height direction of the vacuum space. For example, another hole may be provided in a portion at which the support passes through the heat transfer resistor, or the support is in contact with the heat transfer resistor. In this case, after passing through another hole, a fluid passes through the space provided between at least a portion of the first and second plates and the heat transfer resistor and then passes through the through-hole provided in the plate. In this example, when the heat transfer resistor is a radiation resistance sheet, a radiation shielding rate may increase. In another point of view, this example may simplify a process of the radiation resistance sheet. The through-hole may be disposed to overlap at least one of other holes in the height direction of the vacuum space. For example, another hole may be provided in a portion at which the support does not pass through the heat transfer resistor or in a portion at which the support is not in contact with the heat transfer resistor. In this case, the fluid may pass through the through-hole provided in the plate after passing through another hole before passing through the through-hole. In this example, the flow rate of the fluid may increase.

Optionally, the coupling portion may include a tube 40. Examples of the aforementioned tube may be ports such as an exhaust port or a getter port. The present disclosure may be any one of the following examples or a combination of two or more examples. An empty space is defined inside the tube to allow the fluid to pass therethrough. The tube may include at least one of the exhaust port or the getter port. When the tube is a hole for the getter, the getter may be disposed to overlap at least a portion of the tube in a height direction of the vacuum space. In this case, a moving speed of a gas adsorbed to the getter may increase. The tube includes a first portion extending in a first direction from any one of the first and second plates and a second portion extending from the first portion in a second direction different from the first direction. The first direction may be a longitudinal direction of the vacuum space. The second direction may be the height direction of the vacuum space. The tube may include a portion having a degree of deformation resistance greater than that of at least a portion of the heat transfer resistors 30, 31, 32, 33, 60 and 63. The deformation resistance may be generated by a vacuum pressure. The vacuum pressure may be provided while the vacuum adiabatic body vacuum exhaust process is performed. The tube may include a portion having a thickness greater than that of at least a portion of the heat transfer resistor. The tube may include a material that is softer than at least a portion of the heat transfer resistor. In this case, the tube may be easily sealed by the pressure welding. The tube may be disposed so as not to be in contact with at least a portion of the heat transfer resistor. The tube may be disposed to be in contact with another portion of the heat transfer resistor. For example, the tube may be provided so as not to be in contact with the heat transfer resistor. For example, the tube may be provided to be in contact with the conductive resistance sheet 32. The tube may be provided so as not to be in contact with the radiation resistance sheet. In this case, heat transfer between the first and second plates provided via the tube may be reduced. In addition, in at least a portion of the vacuum adiabatic body component assembly process and the vacuum adiabatic body component sealing process, damage of the tube or the heat transfer resistor may be reduced. The tube may be disposed in the empty space provided inside the heat transfer resistor or the empty space provided outside the edge of the heat transfer resistor. An example of the empty space is as follows. The empty space may be provided in the vicinity of the tube. The empty space may be provided to overlap at least a portion of the tube in the height direction of the vacuum space. The heat transfer resistor may include a plurality of portions. The empty space may be provided in a space spaced apart between the plurality of portions. The empty space may be provided in a space spaced apart between first and second portions of the heat transfer resistor. The first portion and the second portion may be provided as separate components separated from each other. The empty space may be provided in a space spaced apart between the heat transfer resistor and the component provided outside the edge of the heat transfer resistor. The heat transfer resistor and the component may be provided as separate components separated from each other. The empty space may be provided in the form of another hole. Examples of another hole are as follows. A circumference area of the tube may be less than at least one of circumference areas of another hole, or a circumference diameter of the tube may be less than at least one of circumference diameters of another hole. In this case, since another hole increases in size, contact between the heat transfer resistor and other components may be reduced, thereby reducing heat conduction. In addition, this example may improve the moving speed of the fluid when another hole is provided as a passage through which the fluid flows. The circumference area of the tube may be greater than one half of the circumference area of another hole, or the circumference diameter of the tube may be greater than one half of the circumference diameter of another hole. In this example, when the through-hole is a passage through which the fluid flows, a speed at which the fluid flows may increase. The tube may be disposed so as not to overlap at least one of other holes in the height direction of the vacuum space. For example, another hole may be provided in a portion at which the support passes through the heat transfer resistor, or the support is in contact with the heat transfer resistor. In this case, after passing through another hole, a fluid passes through the space provided between at least a portion of the first and second plates and the heat transfer resistor and then passes through the through-hole provided in the plate. In this example, when the heat transfer resistor is a radiation resistance sheet, a radiation shielding rate may increase. In addition, this example may simplify a process of the radiation resistance sheet. The tube may be disposed to overlap at least one of other holes in the height direction of the vacuum space. For example, another hole may be provided in a portion at which the support does not pass through the heat transfer resistor or in a portion at which the support is not in contact with the heat transfer resistor. In this case, the fluid may pass through the through-hole provided in the plate after passing through another hole before passing through the through-hole. In this example, the flow rate of the fluid may increase. Examples of the aforementioned tube may be ports such as an exhaust port or a getter port.

Optionally, the tube 40 may include at least one of an inner tube 40*a* provided between an inner surface of the first plate and an inner surface of the second plate or an outer tube 40*b* disposed outside the inner surface of the first plate or the inner surface of the second plate. Examples of the inner tube are as follows. One end of the inner tube may be connected to the through-hole 41 defined in any one of the first and second plates. The other end of the inner tube may be disposed so as not to be in contact with the heat transfer resistor. The other end of the inner tube may be provided between any one of the first and second plates and the heat transfer resistor, or the other end of the inner tube may be provided between the other one of the first and second plates and the heat transfer resistor. In this case, heat transfer between the first and second plates 10 and 20 provided via the tube may be reduced. The inner tube may include a portion extending in a height direction of the vacuum space.

A length of the extending portion in the height direction of the vacuum space may be less than that of at least one of distances between the plates, in which the through-hole is defined, of the first and second plates and the heat transfer resistor. A length of the extending portion in the height direction of the vacuum space may be less than that of at least one of distances between the plates, in which the through-hole is not defined, of the first and second plates and the heat transfer resistor. This example may reduce heat transfer to other portions via the tube. For example, the heat transfer to the heat transfer resistor via the tube may be reduced. A length of the extending portion in the height direction of the vacuum space may be greater than at least one of the distances between the plates, in which the through-hole is defined, of the first and second plates and the heat transfer resistor, may be equal to or greater than at least one of the distances between the plates, in which the through-hole is not defined, of the first and second plates, and may be greater than at least one of thicknesses of the heat transfer resistor. This example may increase in sealing area if a seal is provided in the tube or in the vicinity of the tube. Examples of the aforementioned tube may be ports such as an exhaust port or a getter port.

Optionally, the component coupling portion may include a curved portion R defining the through-hole 41. An example of the curved portion is as follows. The present disclosure may be any one of the following examples or a combination of two or more examples. The curved portion may be provided on at least one of the plate and the tube connected to the plate. The curved portion may be provided to surround the through-hole. In this case, when the through-hole or the vicinity of the through-hole is sealed, uniformity of sealing may be improved. The curved portion may include a portion extending from the plate, in which the through-hole is defined, in the height direction of the vacuum space. In this case, when sealing the through-hole or the vicinity of the through-hole, the sealing area may be secured. In another point of view, this example has the advantage that, when a filler metal is used for sealing, the filler metal is permeated in a direction of gravity. A length of the extending portion in the height direction may be greater than at least one of thicknesses of the heat transfer resistor. In this case, when a seal is provided on the tube 40 or in the vicinity of the tube, a sealing area may increase. The curved portion may be disposed so as not to be in contact with at least a portion of the heat transfer resistor, the curved portion may be disposed in the empty space provided inside the heat transfer resistor or the empty space provided outside the edge of the heat transfer resistor, or the curved portion may be disposed in the through-hole 41 provided in at least a portion of the plate and the heat transfer resistor. In this example, the damage of the curved portion or the heat transfer resistor may be reduced in at least a portion of the vacuum adiabatic body component assembly process and the vacuum adiabatic body component sealing process. In another point of view, this example may reduce the heat transfer between the first and second plates provided via the curved portion. In another point of view, in this example, when the through-hole provided in the vicinity of the curved portion is a passage through which the fluid flows, a speed at which the fluid flows may increase. The curved portion may be provided on the heat transfer resistor. In this example, when the heat transfer resistor includes a portion having a thickness less than that of at least one of the first and second plates, the process of providing the curved portion to the heat transfer resistor is simplified. The curved portion may include a portion having a curvature radius less than that of at least one of other curved portions provided at a portion of the heat transfer resistor. In this case, a degree of deformation resistance of the curved portion may increase. In addition, when the seal is provided on the curved portion or in the vicinity of the curved portion, the seal may decrease in size. For example, the portion may be provided on the peripheral portion of the heat transfer resistor, and any one of the first and second plates may be provided to be integrated with the heat transfer resistor. More specifically, the portion may be provided at a portion at which the heat transfer resistor is separated while in contact with a portion of the first and second plates. As another example, the portion may be provided at a center of the heat transfer resistor. The heat transfer resistor may be provided to be coupled to or sealed to at least one of the first or second plate. More specifically, at least a portion of the heat transfer resistor may be provided on at least a portion of the peripheral portions of the first and second plates. The portion may be provided to be recessed toward the vacuum space while surrounding the edges of the first and second plates. As another example, another curved portion may be provided on the heat transfer resistor while the vacuum adiabatic body vacuum exhaust process is performed.

Optionally, the component coupling portion may be provided on the peripheral portion of the vacuum adiabatic body, or the component coupling portion may be provided on the peripheral portion of the heat transfer resistor. In this case, consumer sensibility may be improved.

Examples related to seals 41, R, and 40*c* are as follows. The seal may be provided between the through-hole 41 of the component coupling portion and the tube 40 of the component coupling portion. The seal may include the curved portion R formed between the through-hole and the tube. In this case, there is an advantage in that a sealing area is secured. Before the vacuum adiabatic body vacuum exhaust process is performed, the curved portion may be sealed. The sealing may be performed through welding. For example, the sealing may have a temperature greater than a melting point of any one of the heat transfer resistors and may be performed at a temperature less than the melting point of the other one of the heat transfer resistors. As another example, the sealing may be greater than a melting point of the radiation resistance sheet of the heat transfer resistor and may be performed at a temperature less than a melting point of the conductive resistance sheet of the heat transfer resistor. The seal may be provided at an edge 40*c* of the tube of the component coupling portion. The edge of the tube may be provided at a portion except between the through-hole of the component coupling portion and the tube of the component coupling portion. After the vacuum adiabatic body vacuum exhaust process is performed, the edge may be sealed. For example, the sealing may be performed through pressure welding. The sealing may be performed at a portion sealed by high-frequency brazing. The seal may be disposed so as not to be in contact with the heat transfer resistor. In this case, during the vacuum adiabatic body vacuum component sealing process is performed, the damage of the heat transfer resistor may be reduced. Examples of the aforementioned tube may be ports such as an exhaust port or a getter port.

Hereinafter, a relationship between the tube 40, the vacuum space 50, the heat transfer resistor 32, and the support 30 will be described.

Figure 17:
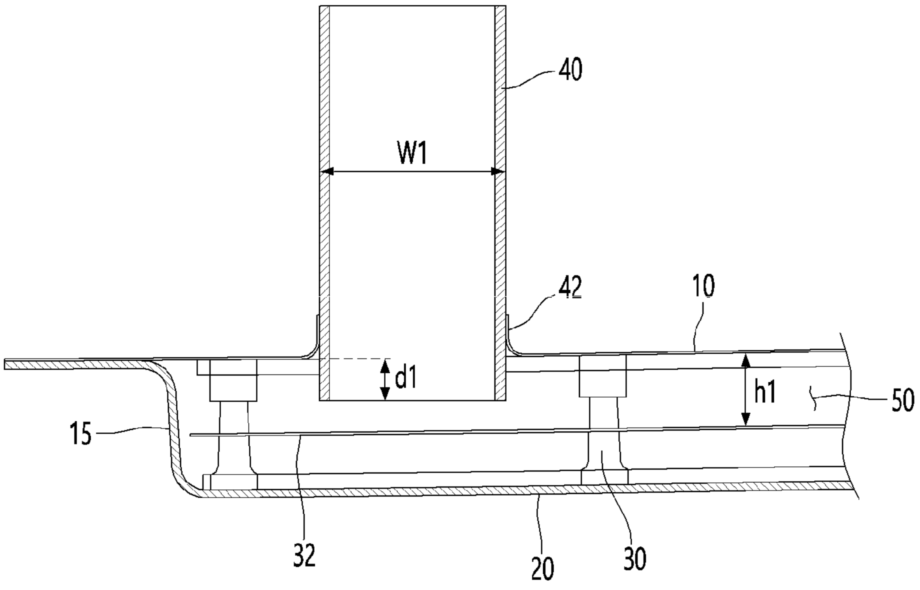
FIG. 17 is a cross-sectional view of the vacuum adiabatic body according to an embodiment.

FIG. 17 is a cross-sectional view of the vacuum adiabatic body according to an embodiment.

Referring to FIG. 17, the vacuum adiabatic body according to an embodiment may include the first plate 10, the second plate 20, the side plate 15, the tube 40, the vacuum space 50, the heat transfer resistor 32, and a support 30. For each of the above configurations, the already presented explanations may be applied. The tube 40 may be inserted into the vacuum space 50 by a predetermined length. Examples of the aforementioned tube may be ports such as an exhaust port or a getter port.

A height d1 from the first plate 10 to an insertion end of the tube 40 may be less than a height of the vacuum space 50. The tube 40 may be supported on the flange 42. The contact between the tube 40 and the second plate 20 may be prevented to reduce an adiabatic loss. The height d1 from the first plate 10 to the insertion end of the tube 40 may be less than a height h1 from the first plate 10 to the heat transfer resistor 32. The contact between the tube 40 and the heat transfer resistor 32 may be prevented to reduce an adiabatic loss. Examples of the aforementioned tube may be ports such as an exhaust port or a getter port.

According to this embodiment, there is no need to provide the through-hole, through which the tube 40 passes, in the heat transfer resistor 32. If the through-hole is not provided, an entire area of the heat transfer resistor 32 may be used for the radiation resistance, and thus the radiation shielding effect may increase. Since there is no need to process the through-hole, there is an advantage in that the component manufacturing process is simplified. However, an air flow interval between the tube 40 and the heat transfer resistor 32 may be narrowed. When the air flow interval is narrowed, there is a limitation in that flow resistance of air increases and thus an exhaust process time may increase. When the air flow interval is narrowed, the heat transfer resistor 32 may be deformed due to low static pressure during air flow. Examples of the aforementioned tube may be ports such as an exhaust port or a getter port.

Figure 18:
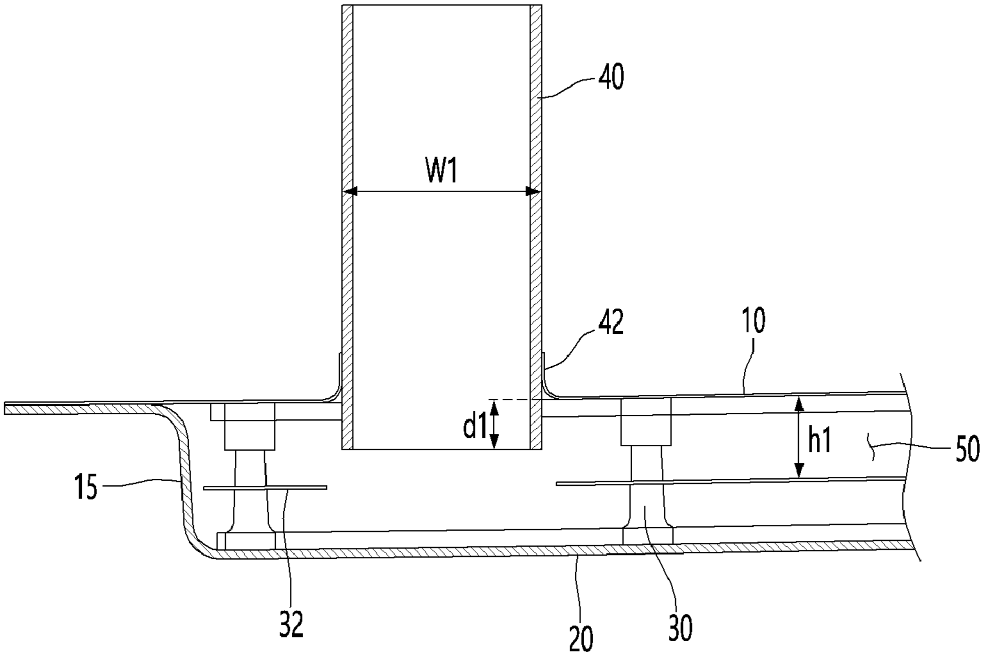
FIG. 18 is a cross-sectional view of a vacuum adiabatic body according to another embodiment.

FIG. 18 is a cross-sectional view of the vacuum adiabatic body according to another embodiment.

Referring to FIG. 18, this embodiment relates to a view illustrating a case in which the through-hole is defined in the heat transfer resistor 32. According to this embodiment, the height d1 from the first plate 10 to the insertion end of the tube 40 may be less than the height of the vacuum space 50. The through-hole may be provided in the heat transfer resistor 32 spaced vertically from the insertion end of the tube 40. According to this embodiment, a distance between the tube 40 and the heat transfer resistor 32 may increase. Accordingly, there is an effect of shortening the exhaust process time and preventing deformation of the heat transfer resistor 32. However, there is a disadvantage in that the radiation shielding effect decreases as much as an area in which the through-hole is defined. Examples of the aforementioned tube may be ports such as an exhaust port or a getter port.

In the case of this embodiment, a relationship between the through-hole, the heat transfer resistor 32 and the support 30 will be described.

Figure 19:
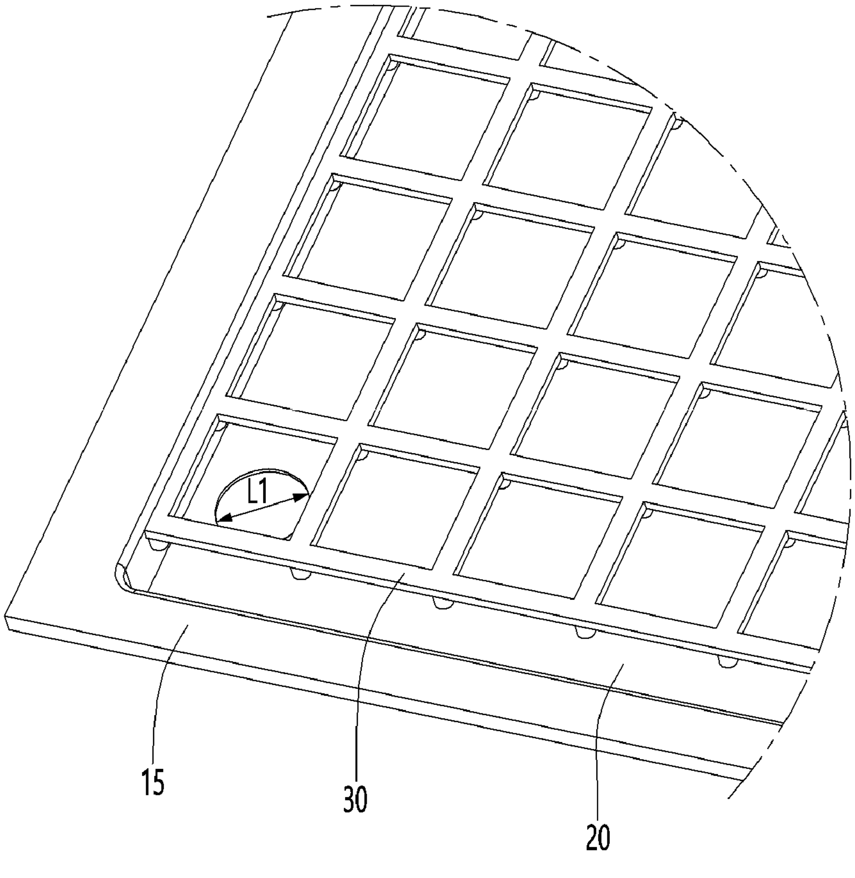
FIG. 19 is a perspective view illustrating a corner portion of the vacuum adiabatic body in a state in which a first plate is removed.
Figure 20:
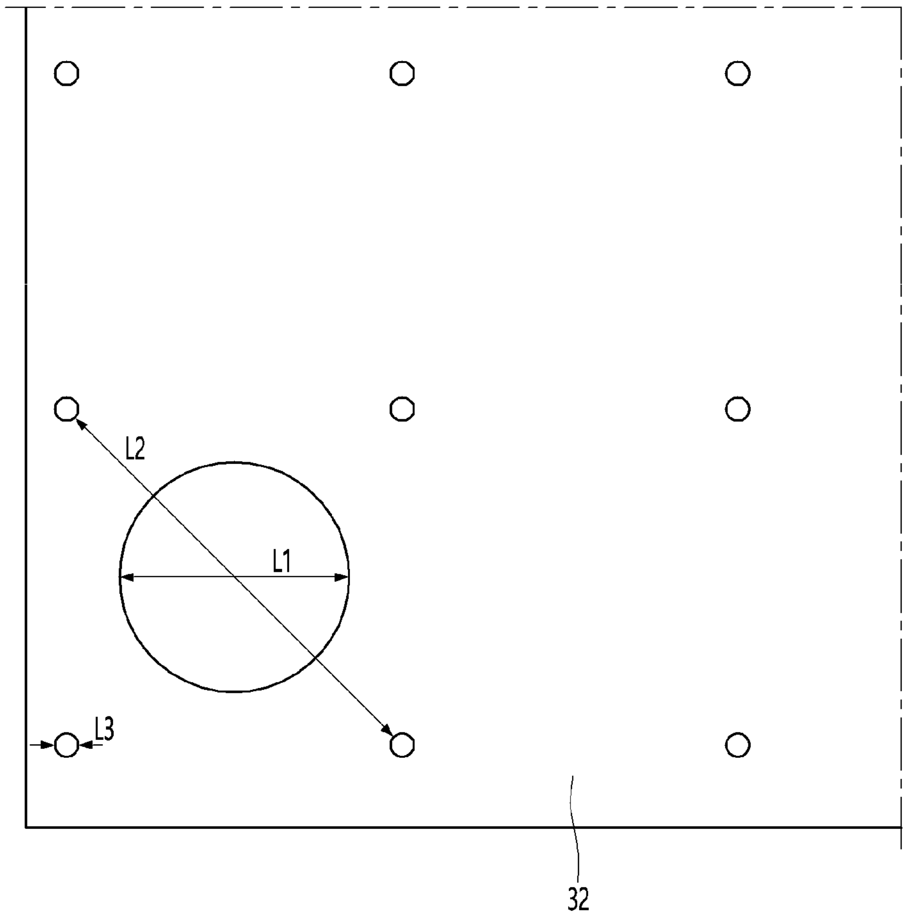
FIG. 20 is a plan view illustrating a corner portion of a radiation resistance sheet.

FIG. 19 is a perspective view illustrating a corner portion of the vacuum adiabatic body in a state in which the first plate is removed, and FIG. 20 is a plan view illustrating a corner portion of the radiation resistance sheet.

Referring to FIGS. 19 and 20, the support 30 may include a plurality of bars and a connection plate connecting the plurality of bars. Each of the bars may pass through a bar through-hole of the heat transfer resistor 32. The bar may have a minimum outer diameter portion having the smallest diameter at a point corresponding to the bar through-hole. The diameter of the minimum outer diameter portion may be less than that of the bar through-hole. Thus, heat conduction between the bar and the heat transfer resistor 32 may be prevented. Each of upper and lower portions of the minimum outer diameter portion may have a diameter greater than that of the minimum outer diameter portion. Using this structure, the bar may support the heat transfer resistor 32. An average diameter of the bars may be greater than a diameter L3 of the bar through-hole. An average diameter of the bar through-hole and the bars may be less than the diameter of the tube. Heat conduction through the bar may be reduced. A radiation shielding loss through the bar through-hole may decrease. The average diameter of the bars may be an average of the diameters of the bars in a vertical length of the bar. Examples of the aforementioned tube may be ports such as an exhaust port or a getter port.

An outer diameter W1 of the tube 40 is less than a diameter L1 of the through-hole of the heat transfer resistor 32. According to this configuration, it is possible to prevent the contact between the tube 40 and the heat transfer resistor 32, thereby reducing the adiabatic loss. Since the distance between the tube 40 and the heat transfer resistor 32 increases, flow resistance may be reduced. The tube 40 may further descend through the through-hole. Examples of the aforementioned tube may be ports such as an exhaust port or a getter port.

The diameter L1 of the through-hole of the heat transfer resistor 32 may be less than a diagonal length L2 of a pair of adjacent bars of the support 30. According to this configuration, the heat transfer resistor 32 may be completely fixed to the support 30. For example, if the diameter L1 of the through-hole of the heat transfer resistor 32 is greater than the diagonal length L2 of the pair of adjacent bars of the support 30, the bar through-hole may not be provided in a position at which the tube 40 is placed. In this case, the heat transfer resistor 32 may not be fixed to the support 30 at the point at which the tube 40 is placed. As a result, there is a limitation in that a free end of the heat transfer resistor 32 increases at the point at which the tube 40 is placed. If the heat transfer resistor 32 is deformed differently from its original design, there is a limitation in that the heat transfer resistor 32 is in contact with the support 30 or the flange or the tube 40 to increase in adiabatic loss. A diameter L3 of the bar through-hole may be less than the diameter L1 of the through-hole. Accordingly, a large area of the heat transfer resistor 32 may be smoothly supported. Examples of the aforementioned tube may be ports such as an exhaust port or a getter port.

Figure 21:
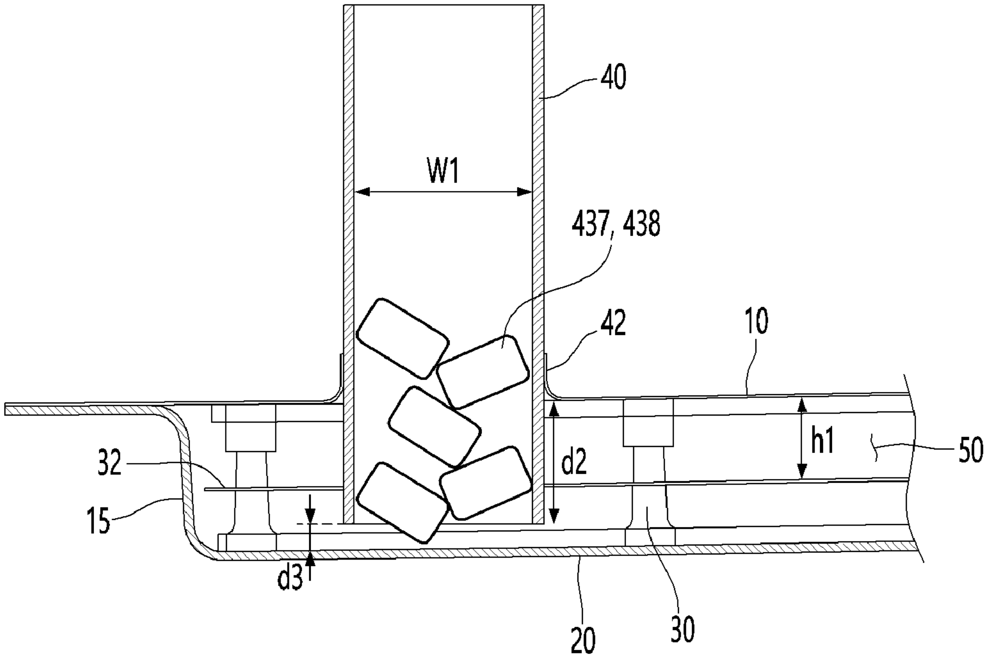
FIG. 21 is a cross-sectional view of a vacuum adiabatic body according to another embodiment.

FIG. 21 is a cross-sectional view of the vacuum adiabatic body according to another embodiment.

Referring to FIG. 21, a getter may be accommodated in the tube 40. The tube 40 may be deeply inserted into the vacuum space 50 so that the tube 40 accommodates the getter. The getter may be input into the tube 40 while being activated at the outside during the exhaust process. After the getter is input, pinch-off may be performed. Examples of the aforementioned tube may be ports such as an exhaust port or a getter port.

A length d2 from the first plate 10 to the insertion end of the tube 40 may be greater than a length h1 from the first plate 10 to the heat transfer resistor 32. The tube 40 may pass through the through-hole. The getter may not freely move within the vacuum space 50. The getter may be restricted in movement by the tube 40. The getter may be placed between the inner space of the tube 40 and the insertion end of the tube 40 and the second plate 20. For this, the length d2 from the first plate 10 to the insertion end of the tube 40 may be greater than a length d3 between the insertion end of the tube 40 and the second plate 20. The length d2 from the first plate 10 to the insertion end of the tube 40 may satisfy conditions, in which the getter is not separated from the tube 40, and the flow resistance of air during the exhaust is small. Examples of the aforementioned tube may be ports such as an exhaust port or a getter port.

According to this embodiment, there is an advantage that a separate getter mounting space or a separate getter port 40 is not required. However, since a gap between the tube 40 and the second plate 20 is narrow, the flow resistance of the air may increase during the exhaust. Also, there may be a limitation that an exhaust time increases. Examples of the aforementioned tube may be ports such as an exhaust port or a getter port.

Figure 22:
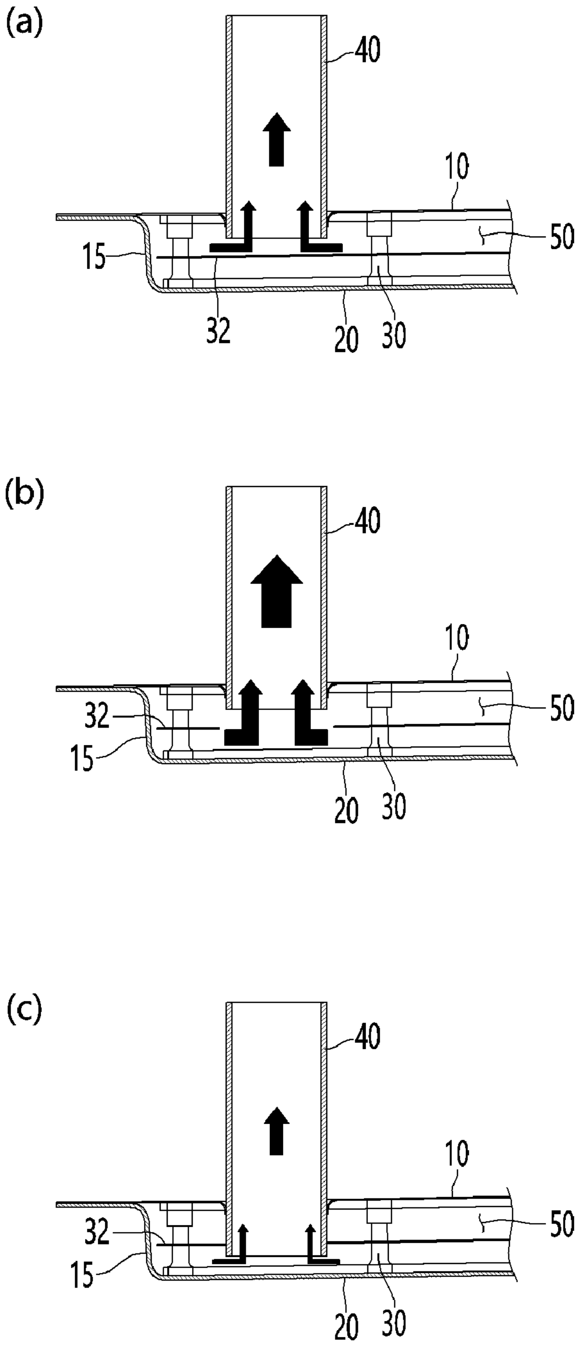
FIG. 22 is a view for comparing and explaining the embodiments, wherein (a) of FIG. 22 is a view for explaining an operation according to an embodiment of FIG. 17, (b) of FIG. 22 is a view for explaining an operation according to an embodiment of FIG. 18, and (c) of FIG. 22 is a view for explaining an operation according to an embodiment of FIG. 21.

Referring to FIG. 22, in the case of each of the above embodiments, an interaction between the tube and the vacuum space will be compared and described.

FIG. 22 is a view for comparing and explaining the three embodiments, wherein (a) of FIG. 22 is a view for explaining an operation according to an embodiment of FIG. 17, (b) of FIG. 22 is a view for explaining an operation according to an embodiment of FIG. 18, and (c) of FIG. 22 is a view for explaining an operation according to an embodiment of FIG. 21.

Referring to (a) of FIG. 22, as the air flow interval is gradually narrowed, there are limitations in that the air flow resistance increases, the exhaust process time increases, and the heat transfer resistor 32 is deformed toward the tube 40 due to the low static pressure according to according to Bernoulli's theorem when air flows through the air flow interval. However, since the through-hole is not provided, the heat transfer resistor 32 may be conveniently processed, and the radiation shielding effect of the heat transfer resistor 32 may increase. Examples of the aforementioned tube may be ports such as an exhaust port or a getter port.

Referring to (b) of FIG. 22, since the through-hole is provided, the flow resistance of air is reduced, and thus the exhaust process time is shortened. However, there is a concern that the radiation shielding effect of the heat transfer resistor 32 is reduced, and the manufacturing process becomes complicated for processing the through-hole.

Referring to (c) of FIG. 22, there are advantages in that a separate getter port 40 is not required, and the getter position is easy to be fixed after the getter is input. Since the getter port 40 is not required, the process of manufacturing the vacuum adiabatic body may be simplified. When the height d1 of the tube 40 is too high, the gap between the tube 40 and the second plate 20 may be narrowed, and thus the flow resistance of the air may increase to increase in exhaust time. Examples of the aforementioned tube may be ports such as an exhaust port or a getter port.

The getter port may refer to a port for inserting the getter and supporting the getter. The getter pot includes a heating type getter pot and a non-heating type getter pot.

Figure 23:
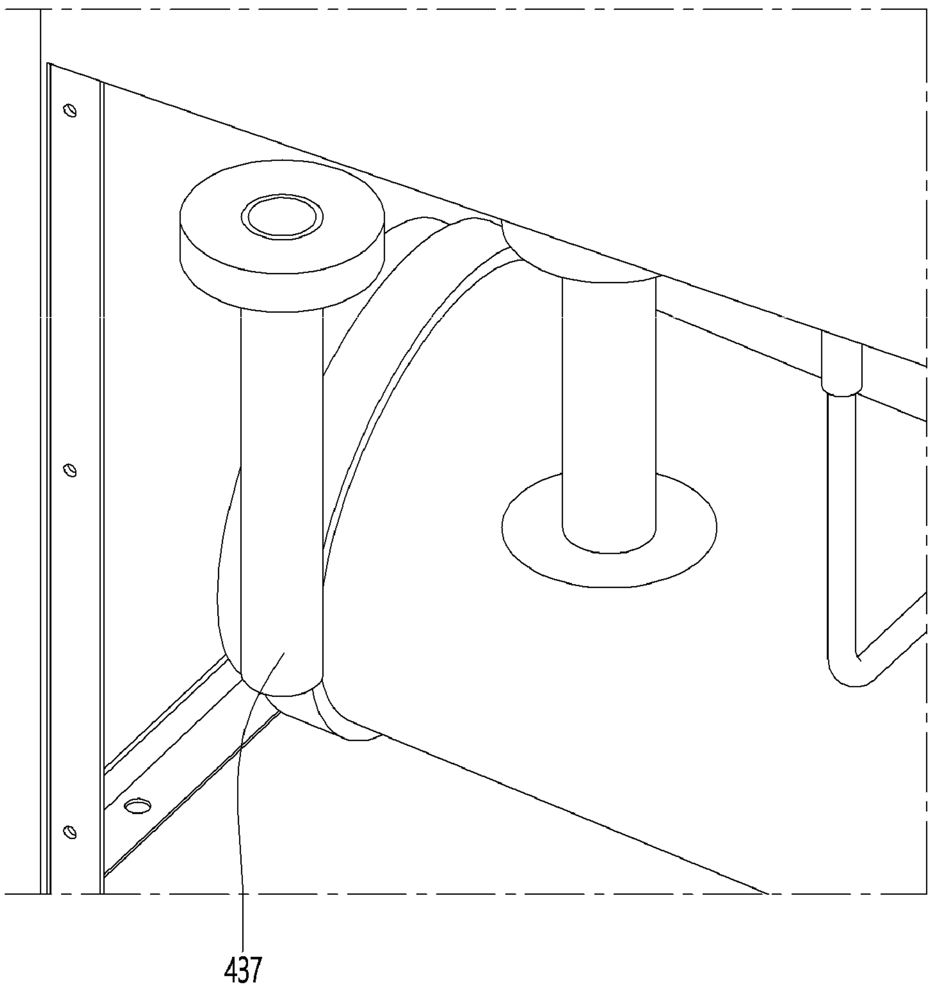
FIG. 23 is a view illustrating a configuration of a heating type getter port.

FIG. 23 is a view illustrating a configuration of the heating type getter port.

Referring to FIG. 23, the heating type getter port 437 will be described. After a heating type getter such as ST2002 is put into the tube and sealed, heat may be applied outside the heating type getter port 437 to activate the getter. The heat may be applied directly to the heated getter port. The getter port may not be an essential configuration and may be input after activation by heating the heating type getter from the outside. The heating type (activation type) getter may be less than the non-heating type (inactivation type) getter. In the case of this embodiment, a height of the vacuum space may be smaller by using the heating type getter having a small size. In an embodiment, the tube 40 may serve as both the exhaust port and the getter port without a separate getter port. In an embodiment, the separate getter port may be separately provided together with the exhaust port. When the exhaust port and the getter port are separately provided, the getter port may be larger than the exhaust port. Thus, the getter port may accommodate a sufficient amount of getter. Examples of the aforementioned tube may be ports such as an exhaust port or a getter port.

Figure 24:
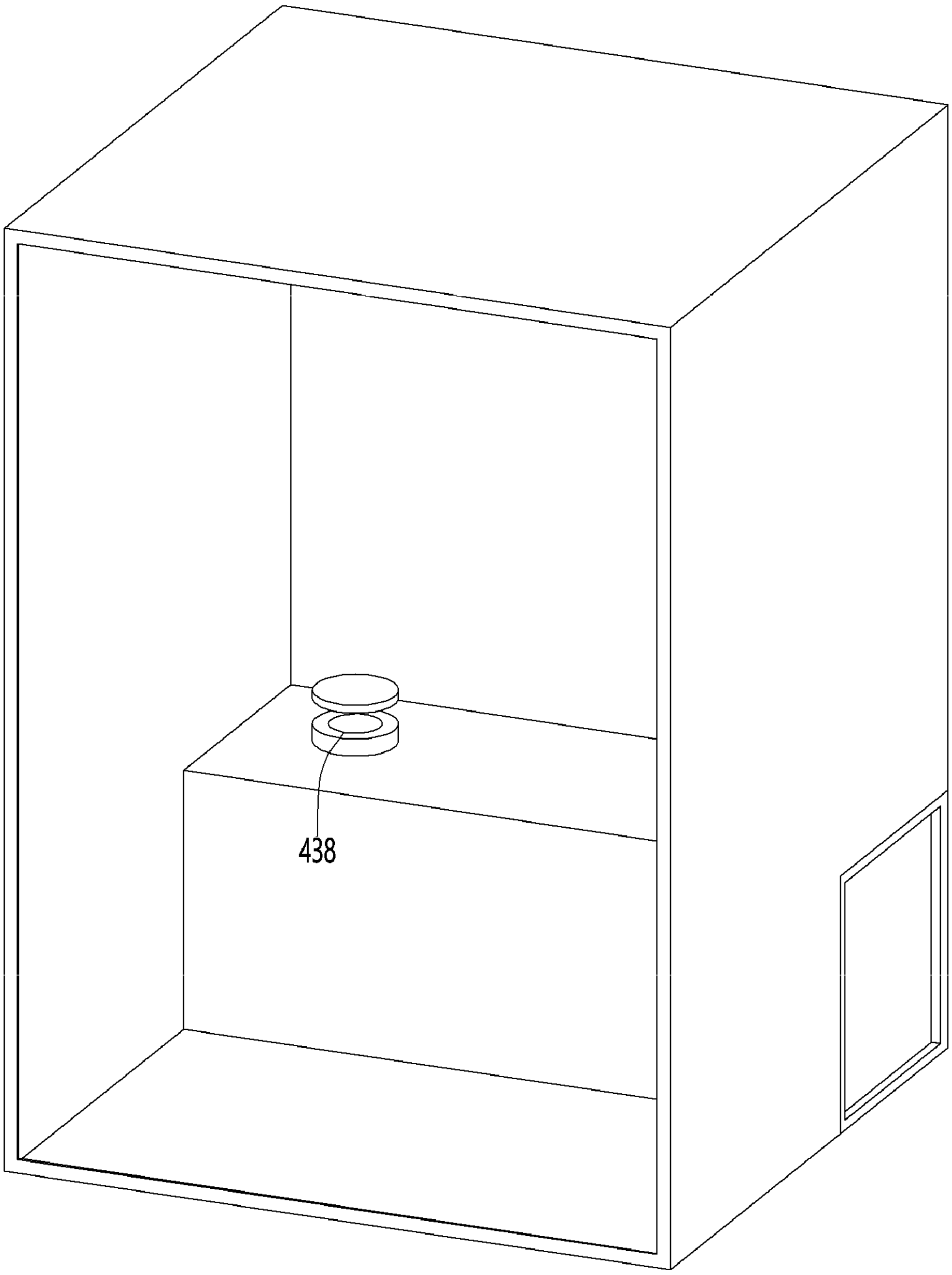
FIG. 24 is a view illustrating a configuration of a non-heating type getter port.

FIG. 24 is a view illustrating a configuration of the non-heating type getter port.

Referring to FIG. 24, the non-heating type getter port 438 will be described. A tube for mounting the getter that does not require large or high activation such as a combo getter may be separately provided. The combo getter may be a silica-based type, and the exhaust process may start after being input in the vacuum space 50 before the exhaust process. After the non-heating type getter is input, the non-heating type getter may be coupled to a cover. In this case, the getter port may not be essential, and a formed portion having a predetermined shape may be provided on a surface of the vacuum adiabatic body, or the getter may be supported by inserting the getter between the supports 30. Even in the case of this embodiment, the non-heating type getter may be used.

A position of the tube 40 will be described. The getter may be provided in a small size, i.e., have a height of about 4 mm to about 5 mm. The tube 40 may be provided in the second vacuum space having a height less than that of the first vacuum space having a higher height. The second vacuum space 50 may be provided in the peripheral portion of the first vacuum space 50. The second vacuum space may be a vacuum space extension portion. In this case, the tube 40 may be any one of the getter port, the exhaust port, and the getter port/getter port-integrated tube. The getter may be disposed between lattices of the support 30 to secure a placement position of the getter. Thus, it is possible to stably fix the placement position of the getter. Examples of the aforementioned tube may be ports such as an exhaust port or a getter port.

INDUSTRIAL APPLICABILITY

According to the embodiment, the vacuum adiabatic body that is capable of being applied to real life may be provided.

The invention claimed is:

1. A vacuum adiabatic body comprising:
- a first plate;
- a second plate separated from the first plate in a first direction to provide a vacuum space between the first plate and the second plate;
- a sheet that reduces a heat transfer between the first plate and the second plate; and
- a through-hole and a tube provided at a portion of the first plate,
- wherein:
  - the tube includes an inner section provided between the first plate and the second plate, and an outer section extending outside of the first plate,
  - the inner section has a first end connected to the through-hole defined in the first plate and a second end positioned between the first plate and the second plate, and
  - the tube does not contact the sheet, and
- wherein the second end is an insertion end of the tube, and a height d1 from the first plate to the insertion end of the tube is less than a height of the vacuum space.

2. The vacuum adiabatic body according to claim 1, wherein the sheet is provided between the first plate and the second plate, and wherein the second end of the inner section is provided in a space between the sheet and the first plate.

3. The vacuum adiabatic body according to claim 1, wherein the sheet is provided between the first plate and the second plate, and wherein the second end of the inner section is provided in a space between the sheet and the second plate.

4. The vacuum adiabatic body according to claim 1, wherein the sheet is provided between the first plate and the second plate, and wherein a portion of the tube has a degree of deformation resistance, which is greater than that of at least a portion of the sheet.

5. The vacuum adiabatic body according to claim 4, wherein the deformation resistance is generated by a vacuum pressure provided while air is being removed from the vacuum space between the first plate and the second plate.

6. The vacuum adiabatic body according to claim 4, wherein the portion of the tube has a thickness less than that of the at least a portion of the sheet.

7. The vacuum adiabatic body according to claim 4, wherein the tube includes a material that is softer than a material included in at least a portion of the sheet.

8. An appliance comprising a vacuum adiabatic body of claim 1.

9. A vacuum adiabatic body comprising:

a first plate;

a second plate separated from the first plate in a first direction to provide a vacuum space between the first plate and the second plate;

a sheet provided to reduce a heat transfer between the first plate and the second plate; and a through-hole and a tube provided at a portion of the first plate, wherein the tube is received in the through-hole and does not contact the sheet, and wherein an end of the tube is closer to the second plate than the first plate.

10. The vacuum adiabatic body according to claim 9, wherein the sheet is provided between the first plate and the second plate, and wherein the sheet includes an opening, and the opening is provided in a vicinity of the tube.

11. The vacuum adiabatic body according to claim 10, wherein the opening defined by the sheet overlaps at least a portion of the tube in the first direction.

12. The vacuum adiabatic body according to claim 10, wherein the opening is provided in an interior of the sheet or provided outside an edge of the sheet.

13. The vacuum adiabatic body according to claim 9, wherein a second section of the tube is positioned to be in contact with a portion of the sheet.

14. The vacuum adiabatic body according to claim 13, wherein the sheet includes a first sheet contacting at least one of the first plate and the second plate, and a second sheet that does not contact the first plate and the second plate, and wherein the tube is provided to be in contact with the first sheet, but provided so as not to be in contact with the second sheet.

15. An appliance comprising a vacuum adiabatic body of claim 9.

16. A vacuum adiabatic body comprising:

a first plate;

a second plate separated from the first plate in a first direction to provide a vacuum space between the first plate the second plate;

a through-hole and a tube provided at a portion of the first plate, wherein:

the tube includes an inner section provided between the first plate and the second plate, and an outer section extending outside of the first plate, and an end of the inner section is closer to the second plate than the first plate.

17. The vacuum adiabatic body according to claim 16, further comprising a sheet that reduces a heat transfer between the first plate and the second plate.

18. The vacuum adiabatic body according to claim 17, wherein the sheet is provided between the first plate and the second plate, and wherein the end of the inner section is provided in a space between the sheet and the first plate.

19. The vacuum adiabatic body according to claim 17, wherein the end of the inner section does not contact the sheet.

20. An appliance comprising a vacuum adiabatic body of claim 16.

* * * * *